United States Patent
Ohba et al.

(10) Patent No.: US 9,706,114 B2
(45) Date of Patent: Jul. 11, 2017

(54) IMAGE PICKUP APPARATUS, INFORMATION PROCESSING APPARATUS, DISPLAY APPARATUS, INFORMATION PROCESSING SYSTEM, IMAGE DATA SENDING METHOD, IMAGE DISPLAYING METHOD, AND COMPUTER PROGRAM

(71) Applicant: Sony Computer Entertainment Inc., Tokyo (JP)

(72) Inventors: Akio Ohba, Kanagawa (JP); Hiroyuki Segawa, Kanagawa (JP); Hidehiko Ogasawara, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 56 days.

(21) Appl. No.: 14/803,432

(22) Filed: Jul. 20, 2015

(65) Prior Publication Data
US 2016/0080645 A1    Mar. 17, 2016

(30) Foreign Application Priority Data

Sep. 12, 2014  (JP) ................................. 2014-186670

(51) Int. Cl.
H04N 5/232 (2006.01)
H04N 13/00 (2006.01)
(Continued)

(52) U.S. Cl.
CPC ....... H04N 5/23229 (2013.01); G02B 27/017 (2013.01); H04N 5/23206 (2013.01);
(Continued)

(58) Field of Classification Search
CPC ............... H04N 5/23229; H04N 9/045; H04N 5/23206; H04N 5/341; H04N 5/343;
(Continued)

(56) References Cited

U.S. PATENT DOCUMENTS

| 5,691,768 A * | 11/1997 | Civanlar .................. G06T 3/40 375/240.01 |
| 2004/0078265 A1 | 4/2004 | Subramanian et al. |

(Continued)

FOREIGN PATENT DOCUMENTS

| EP | 0 999 518 | 5/2000 |
| JP | 2007-81465 | 3/2007 |

(Continued)

OTHER PUBLICATIONS

Notification of Reason for Refusal dated Aug. 30, 2016 from corresponding Application No. 2015-176030.

*Primary Examiner* — Albert Cutler
(74) *Attorney, Agent, or Firm* — Katten Muchin Rosenman LLP

(57) ABSTRACT

An image pickup apparatus includes: an image data production unit configured to produce data of a plurality of kinds of images from an image frame obtained by picking up an image of an object as a moving picture for each of pixel strings which configure a row; and an image sending unit configured to extract a pixel string in a region requested from a host terminal from within the data of each of the plurality of kinds of images and connect the pixel strings to each other for each unit number of pixels for connection determined on the basis of a given rule to produce a stream and then transmit the stream to the host terminal. The image sending unit switchably determines whether the unit number of pixels for connection is to be set to a fixed value or a variable value in response to the kind of each image.

19 Claims, 23 Drawing Sheets

(51) Int. Cl.
*H04N 13/02* (2006.01)
*H04N 13/04* (2006.01)
*G02B 27/01* (2006.01)
*H04N 9/04* (2006.01)

(52) U.S. Cl.
CPC .......... *H04N 9/045* (2013.01); *H04N 13/004* (2013.01); *H04N 13/0059* (2013.01); *H04N 13/0239* (2013.01); *H04N 13/0296* (2013.01); *H04N 13/044* (2013.01); *H04N 13/0484* (2013.01); *H04N 13/0497* (2013.01); *G02B 2027/014* (2013.01); *G02B 2027/0138* (2013.01); *H04N 13/0029* (2013.01)

(58) Field of Classification Search
CPC ...... H04N 5/345; H04N 5/3458; H04N 5/347; H04N 5/23293; H04N 13/004; H04N 13/0484; H04N 13/044; H04N 13/0296; H04N 13/0239; H04N 13/0497; H04N 13/0059; H04N 13/0029; G02B 27/017; G02B 27/01; G02B 2027/0138; G02B 2027/014
USPC .................. 348/231.99, 231.2, 231.3, 231.9
See application file for complete search history.

(56) References Cited

U.S. PATENT DOCUMENTS

| | | | |
|---|---|---|---|
| 2007/0188624 A1* | 8/2007 | Zhang | H04N 1/0402 348/222.1 |
| 2011/0026852 A1* | 2/2011 | Austin | G11B 20/1217 382/305 |
| 2014/0078265 A1* | 3/2014 | Ohba | H04N 5/2628 348/47 |

FOREIGN PATENT DOCUMENTS

| | | |
|---|---|---|
| JP | 2007-243909 | 9/2007 |
| JP | 2010-147696 | 7/2010 |
| JP | 2013-26978 | 2/2013 |
| WO | WO2012157178 | * 11/2012 |

\* cited by examiner

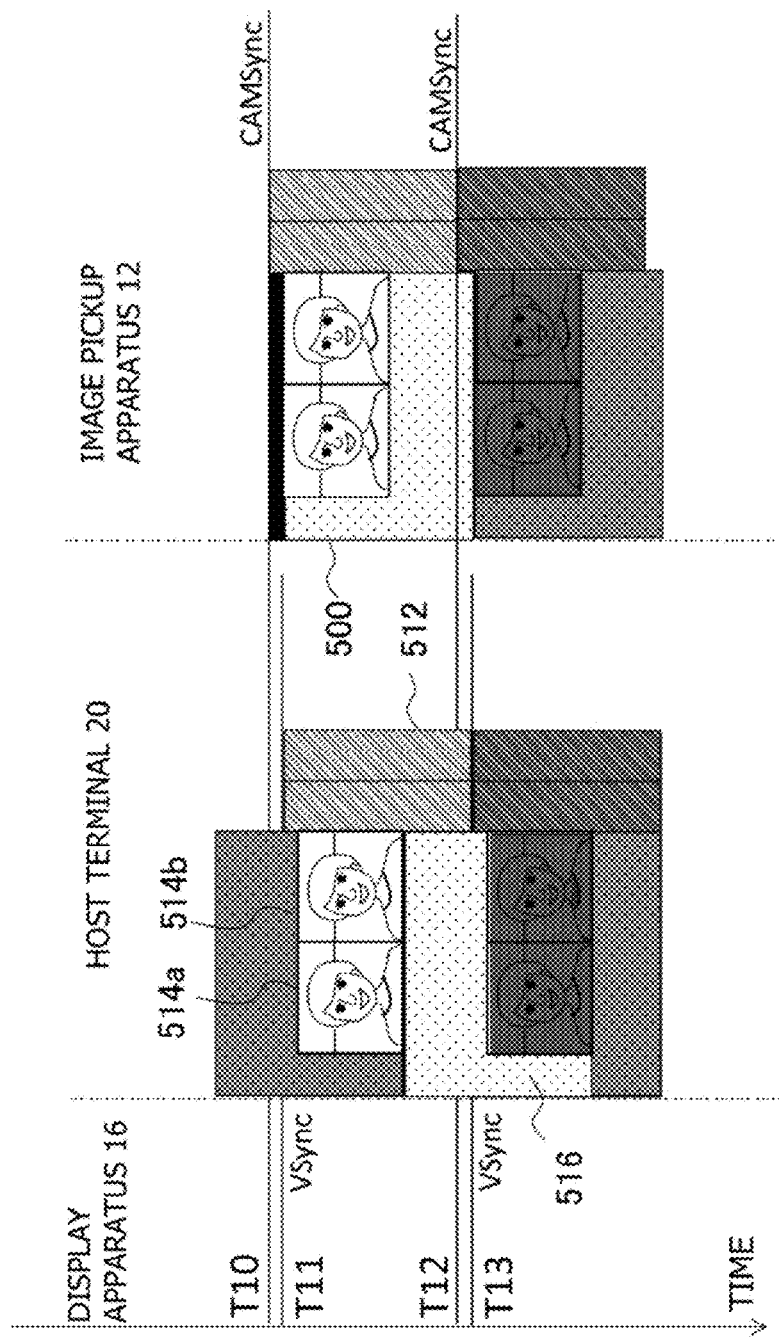

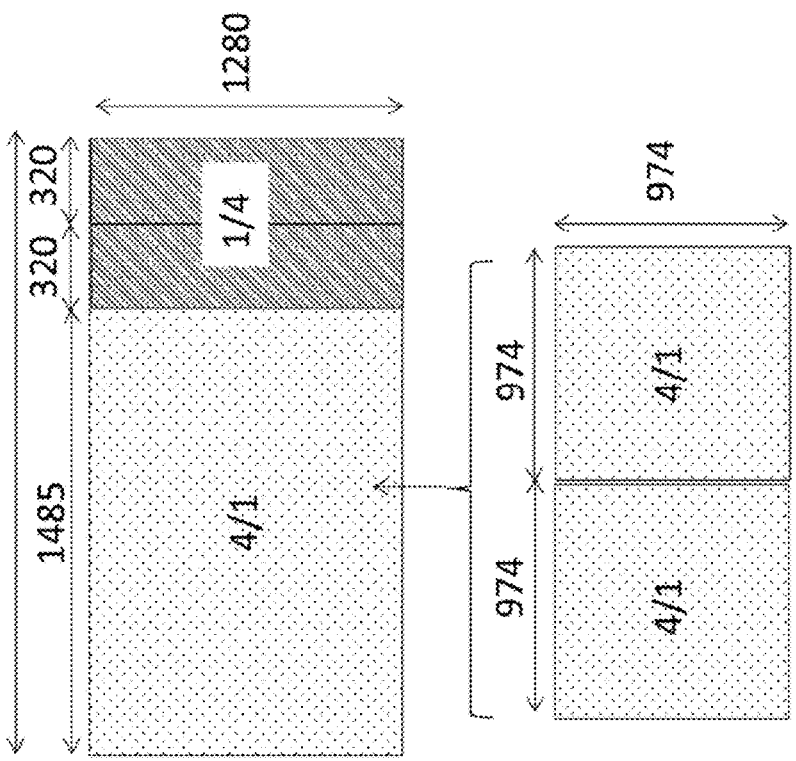
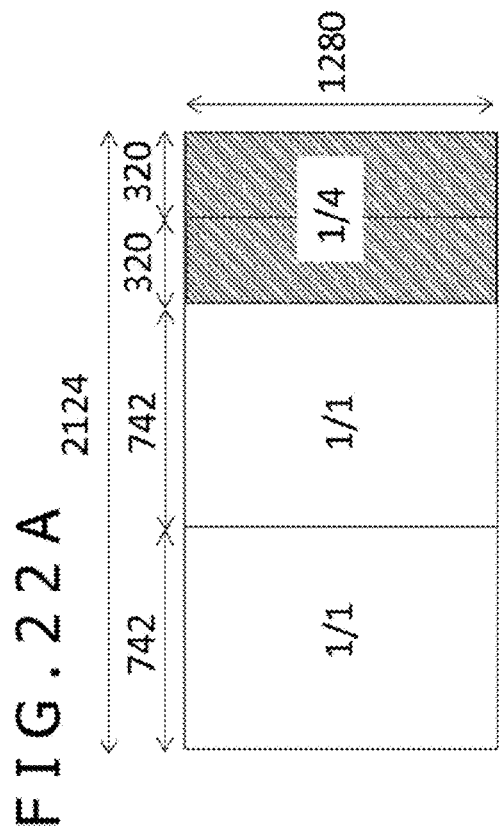
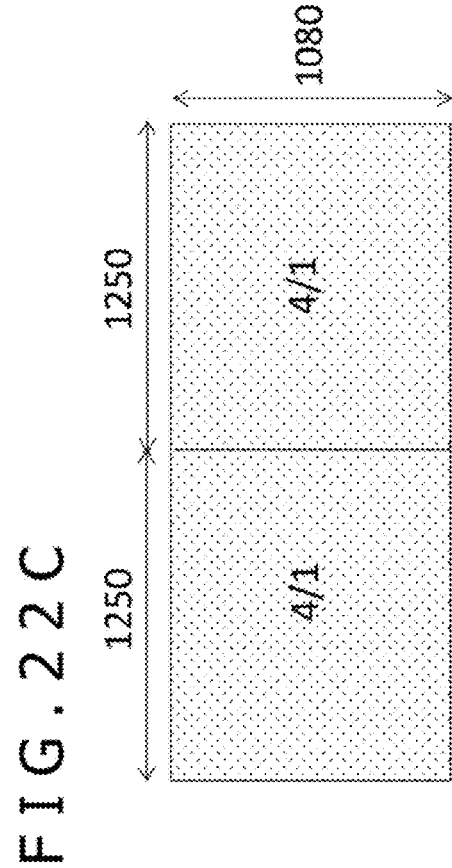

IMAGE PICKUP APPARATUS, INFORMATION PROCESSING APPARATUS, DISPLAY APPARATUS, INFORMATION PROCESSING SYSTEM, IMAGE DATA SENDING METHOD, IMAGE DISPLAYING METHOD, AND COMPUTER PROGRAM

BACKGROUND

The present technology relates to a transmission and processing technology of image data involved in displaying of a picked up image or a rendered image.

A game is known wherein an image of part of the body of a user such as the head is picked up by a video camera and a predetermined region such as an eye, a mouth, or a hand is extracted and then the extracted region is replaced with a different image and displayed in this state on a display unit (refer, for example, to European Patent Application Publication No. 0999518). Also a user interface system is known wherein a movement of a mouth or a hand imaged by a video camera is received as an operation instruction of an application. A technology for picking up an image of the actual world and displaying a virtual world reacting with the movement in the actual world or performing some information processing is utilized in a wide field from a small-sized portable terminal to leisure facilities irrespective of the scale.

SUMMARY

In order to implement an image representation with realistic sensation or perform information processing with high accuracy, it is desired to increase the resolution and the frame rate of a picked up image or a display image. However, since the increase of the resolution or the frame rate increases the data amount to be processed, it causes a problem in terms of the immediacy or the responsiveness. In particular, even if it is tried to increase the resolution and the frame rate, if the processing speed in an apparatus or the data transmission speed between apparatus are insufficient, then the latency from image pickup to display increases. Especially in a mode in which a movement in the actual world is immediately reflected on information processing or a display image, the increase of the latency is likely to be actualized.

The present technology has been made on the basis of the recognition of the above problems by the present inventor. It is desirable to provide a technology, in an information processing system which involves pickup and display of an image, to reduce latency arising from processing or transmission in the inside of the system.

According to an embodiment of the present technology, there is provide an image pickup apparatus including an image data production unit configured to produce data of a plurality of kinds of images from an image frame obtained by picking up an image of an object as a moving picture for each of pixel strings which configure a row, and an image sending unit configured to extract a pixel string in a region requested from a host terminal from within the data of each of the plurality of kinds of images and connect the pixel strings to each other for each unit number of pixels for connection determined on a basis of a given rule to produce a stream and then transmit the stream to the host terminal. The image sending unit switchably determines whether the unit number of pixels for connection is to be set to a fixed value or a variable value in response to the kind of each image.

According to another embodiment of the present technology, there is provided an information processing apparatus including an image processing unit configured to produce data of a plurality of kinds of images to be displayed in one screen, an image extraction unit configured to connect pixel strings, which configure a row of the data of the plurality of kinds of images, to each other for each unit number of pixels for connection determined on a basis of a given rule to produce a stream, and a communication unit configured to transmit the stream to a display apparatus. The image extraction unit switchably determines whether the unit number of pixels for connection is to be set to a fixed value or a variable value in response to the kind of each image.

According to a further embodiment of the present technology, there is provided a display apparatus including a communication unit configured to receive, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection, a frame memory configured to store pixel strings of the second kind image included in the received stream irrespective of the unit for connection, and a display image production unit configured to produce, every time a pixel string of the unit for connection of the first kind image included in the stream is received, pixel strings included in one row of a display screen from the pixel string and read out a pixel string included in a corresponding row of the second kind image from the frame memory and then output the produced pixel strings and the read out pixel string to positions at which the pixel strings are to be displayed in accordance with outputting scanning of the row of the display screen.

According to a still further embodiment of the present technology, there is provided an information processing system including an image pickup apparatus configured to pick up an image of an object as a moving picture, a host terminal, and a display apparatus configured to display a moving picture on a basis of an image frame obtained from the image picked up by the image pickup apparatus. The image pick up apparatus includes an image data production unit configured to produce data of a plurality of kinds of images from the image frame for each of pixel strings which configure a row, and an image sending unit configured to extract a pixel string in a region requested from the host terminal from within the data of the plurality of kinds of images and produce a stream configured by connecting the pixel strings for each number of pixels determined on a basis of a predetermined rule and then transmit the stream to the host terminal. The host terminal includes an image processing unit configured to classify a stream transmitted thereto from the image pickup apparatus for each kind of an image and perform a predetermined process to produce data of a plurality of kinds of images to be used for display, an image extraction unit configured to produce a stream configured by connecting pixel strings, which configure a row of the data of the plurality of kinds of images, for each pixel number determined on a basis of a predetermined rule, and a communication unit configured to transmit the stream to the display apparatus. Both of the image sending unit of the image pickup apparatus and the image extraction unit of the host terminal switchably determine whether the unit number of pixels for connection is to be set to a fixed pixel number equal to a number of pixels for one row in a region of an object of transmission or a number of pixels obtained by equally dividing one row into a given number or to a variable pixel number such that a length of the stream when the connection of the plurality of kinds of images makes one round becomes equal to a given value in response to the kind of each image. The display apparatus includes a frame memory configured to store a pixel string of an image of the variable pixel number included in the received stream irrespective of the unit for connection, and a display image production unit configured to produce, every time a pixel string of the fixed pixel number included in the stream is received, pixel strings included in one row of a display screen from the received pixel string and read out a pixel string included in a corresponding row from within the image of the variable pixel number from the frame memory and then output the produced pixel strings and the read out pixel string to a position at which the pixel strings are to be displayed in accordance with outputting scanning of the row of the display screen.

According to a yet further embodiment of the present technology, there is provided an image data sending method performed by an image pickup apparatus, including producing data of a plurality of kinds of images from an image frame obtained by picking up an image of an object as a moving picture for each of pixel strings which configure a row and storing the produced data into a memory, extracting a pixel string in a region requested from a host terminal from within the data of the plurality of kinds of images stored in the memory and producing a stream configured by connecting the pixel strings for each number of pixels determined on a basis of a given rule, and transmitting the produced stream to the host terminal, the producing switchably determining whether the unit number of pixels for connection is to be set to a fixed value or a variable value in response to the kind of each image.

According to a yet further embodiment of the present technology, there is provided an image data sending method performed by an information processing apparatus, including producing data of a plurality of kinds of images to be displayed in one screen image and storing the produced data into a memory, producing a stream which is configured by connecting pixel strings which are stored in the memory and configure a row of the data of the plurality of kinds of images for each unit number of pixels determined on a basis of a given rule, and transmitting the stream to a display apparatus, the producing switchably determining whether the unit number of pixels for connection is to be set to a fixed value or a variable value in response to the kind of each image.

According to a yet further embodiment of the present technology, there is provided an image displaying method performed by a display apparatus, including receiving, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection, storing pixel strings of the second kind image included in the received stream irrespective of the unit for connection in a frame memory, and producing, every time a pixel string of the unit for connection of the first kind image included in the stream is received, pixel strings included in one row of a display screen from the pixel string, reading out a pixel string included in a corresponding row of the second kind image from the frame memory and then outputting the produced pixel strings and the read out pixel string to positions at which the pixel strings are to be displayed in accordance with outputting scanning of the row of the display screen.

According to a yet further embodiment of the present technology, there is provided a computer program for a computer, including producing data of a plurality of kinds of images from an image frame obtained by picking up an image of an object as a moving picture for each of pixel strings which configure a row, extracting a pixel string in a region requested from a host terminal from within the data of each of the plurality of kinds of images and connecting the pixel strings to each other for each unit number of pixels for connection determined on a basis of a given rule to produce a stream, and transmitting the stream to the host terminal. The producing switchably determines whether the unit number of pixels for connection is to be set to a fixed value or a variable value in response to the kind of each image.

According to a yet further embodiment of the present technology, there is provided a computer program for a computer, including producing data of a plurality of kinds of images to be displayed in one screen; connecting pixel strings, which configure a row of the data of the plurality of kinds of images, to each other for each unit number of pixels for connection determined on a basis of a given rule to produce a stream, and transmitting the stream to a display apparatus. The producing switchably determines whether the unit number of pixels for connection is to be set to a fixed value or a variable value in response to the kind of each image.

According to a yet further embodiment of the present technology, there is provided a computer program for a computer, including receiving, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection, storing pixel strings of the second kind image included in the received stream irrespective of the unit for connection in a frame memory; and producing, every time a pixel string of the unit for connection of the first kind image included in the stream is received, pixel strings included in one row of a display screen from the pixel string and reading out a pixel string included in a corresponding row of the second kind image from the frame memory and then outputting the produced pixel strings and the read out pixel string to positions at which the pixel strings are to be displayed in accordance with outputting scanning of the row of the display screen.

It is to be noted that also arbitrary combinations of the components described above and those obtained by converting representations of the present technology between methods, apparatus, systems, computer programs, recording media in or on which any of the computer programs is recorded and so forth are effectively applied as different modes of the present technology.

With the present technology, information processing that involves image pickup or display can be performed with low latency irrespective of the resolution or the frame rate.

The above and other objects, features and advantages of the present technology will become apparent from the following description and the appended claims, taken in conjunction with the accompanying drawings in which like parts or elements denoted by like reference characters.

BRIEF DESCRIPTION OF THE DRAWINGS

FIG. 21 is a diagrammatic view illustrating a relationship in timing of data transmission in a mode in which the time period from image pickup to display is reduced in the embodiment;

FIGS. 22A to 22C are diagrammatic views depicting an example of a plurality of configurations of a synthesis image.

DETAILED DESCRIPTION OF THE PREFERRED EMBODIMENT

Figure 1:
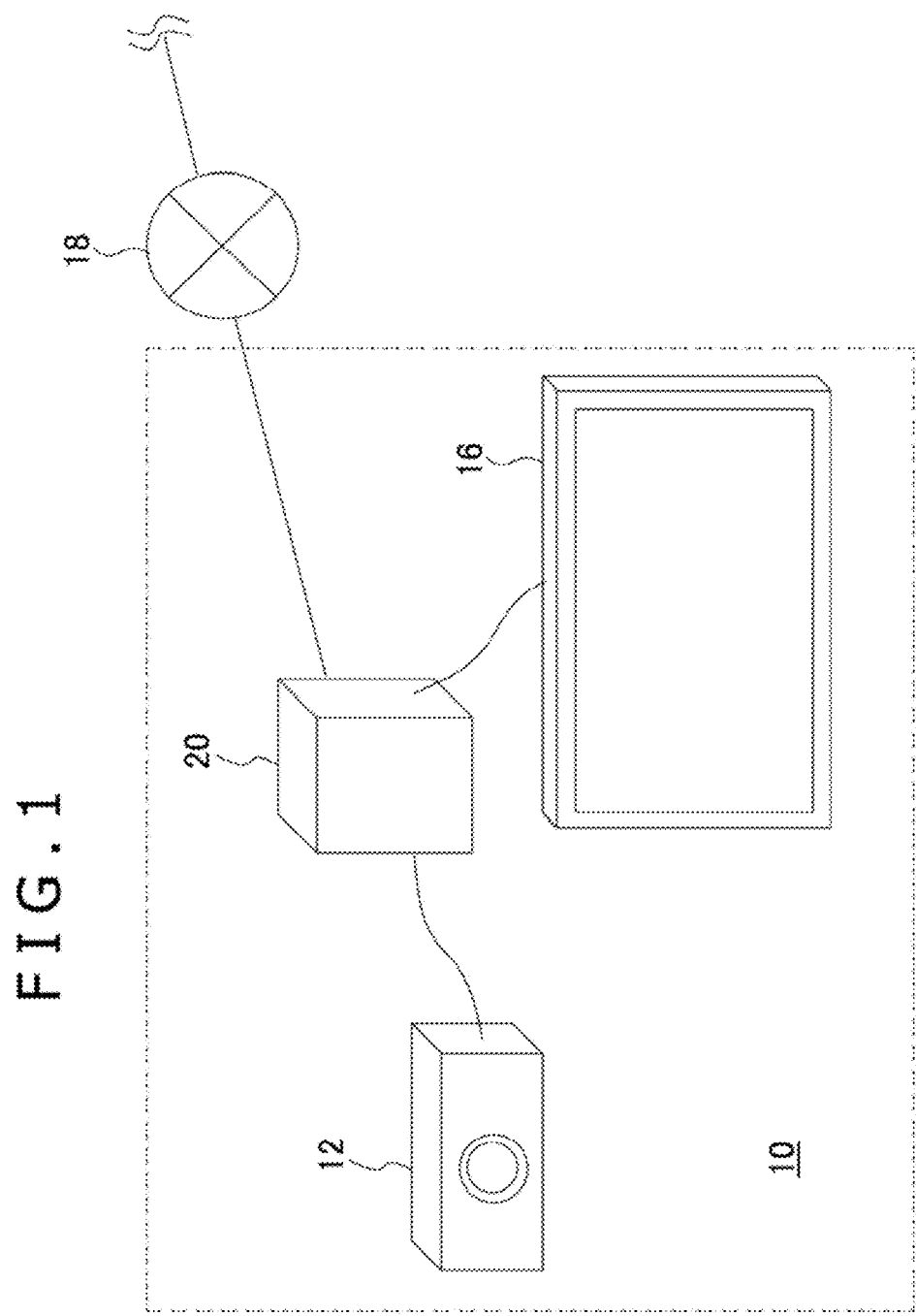
FIG. 1 is a view depicting an example of a configuration of an information processing system to which an embodiment can be applied.

FIG. 1 depicts an example of a configuration of an information processing system to which an embodiment of the present technology can be applied. Referring to FIG. 1, an information processing system 10 includes an image pickup apparatus 12, a host terminal 20, and a display apparatus 16. The image pickup apparatus 12 picks up an image of an image pickup object. The host terminal 20 carries out information processing in accordance with a request of the user on the basis of images picked up by the image pickup apparatus 12. The display apparatus 16 displays an image obtained by the processing by the host terminal 20. The host terminal 20 may be connectable to a network 18 such as the Internet.

The host terminal 20, image pickup apparatus 12, display apparatus 16, and network 18 may be connected to each other by a wire cable or may be connected by wireless connection by a wireless local area network (LAN) or the like. Two or all of the image pickup apparatus 12, host terminal 20, and display apparatus 16 may be combined into and equipped as a unitary member. The information processing system 10 may be implemented, for example, from a camera, a portable terminal or the like which includes the components described above. In any case, the apparent shapes of the image pickup apparatus 12, host terminal 20, and display apparatus 16 are not limited to those depicted in FIG. 1.

The image pickup apparatus 12 includes a camera for picking up an image of an image pickup object at a predetermined frame rate and a mechanism for performing a demosaic process and a reduction process for output data of the camera to produce a plurality of kinds of image data for each frame. The camera includes a visible light sensor used in general digital cameras and digital video cameras such as a charge coupled device (CCD) sensor or a complementary metal oxide semiconductor (CMOS) sensor. Alternatively, a distance image sensor configured from a combination of an infrared light irradiation element and an infrared light sensor may be combined with a general visible light sensor.

The image pickup apparatus 12 may have a stereo camera wherein two cameras are disposed on the left and right in a spaced relationship by a known distance from each other.

Data of images picked up and produced by the image pickup apparatus 12 are transmitted in such a stream format as hereinafter described to the host terminal 20. The host terminal 20 carries out necessary information processing using the image data transmitted thereto to produce data of an image to be used for display. The contents of the processing carried out by the host terminal 20 here are not limited especially but are set suitably depending upon a function requested by the user, the contents of the application or the like.

The host terminal 20 performs general face detection or tracking processing for a picked up image to progress a game in which a character on which a movement of the user who is an object is reflected appears or convert a movement of the user into a command input and perform information processing. The host terminal 20 may otherwise render and display a three-dimensional object on a picked up image to implement augmented reality (AR). In this case, the image pickup object is not limited to the user but may be the interior as viewed from the user side or the like.

The display apparatus 16 displays a result of the processing carried out by the host terminal 20 as an image thereon. The display apparatus 16 may be a television set including a display unit that outputs an image and a speaker that outputs sound and may be, for example, a liquid crystal television set, a plasma television set, or a PC display unit. Alternatively, the display apparatus 16 may be a head-mounted display unit which is mounted on the head of the user and displays an image in front of the eyes of the user.

At this time, a stereo camera may be provided on the image pickup apparatus 12 such that picked up images from the left and right visual points thereby are subjected to processing in accordance with a display method or an application and are displayed in two left and right divisional regions of the screen of the display apparatus 16 to implement a stereoscopic vision.

Alternatively, the display apparatus 16 may be implemented using a display mechanism of a portable terminal or a tablet terminal, an electronic finder of a camera or the like such that it is provided integrally with the image pickup apparatus 12 or the host terminal 20.

Since the information processing system 10 of the present embodiment can be applied to various modes in this manner, also the configuration and the appearance shape of each component may be determined suitably in accordance with the application. In the present embodiment, a system is implemented wherein, in any mode, data transmission between the components and internal processing relating to the transmission are made efficient so that immediacy and responsibility of processing and display are less likely to be damaged by increase of the resolution or the frame rate. The following description is given putting the focus especially on a transmission mechanism for image data. As regards a transmission route of image data, transmission from the image pickup apparatus 12 to the host terminal 20 and transmission from the host terminal 20 to the display apparatus 16 are involved. Since the present embodiment can be applied to the routes independently of each other, the data transmission technique from the image pickup apparatus 12 to the host terminal 20 is described first.

Figure 2:
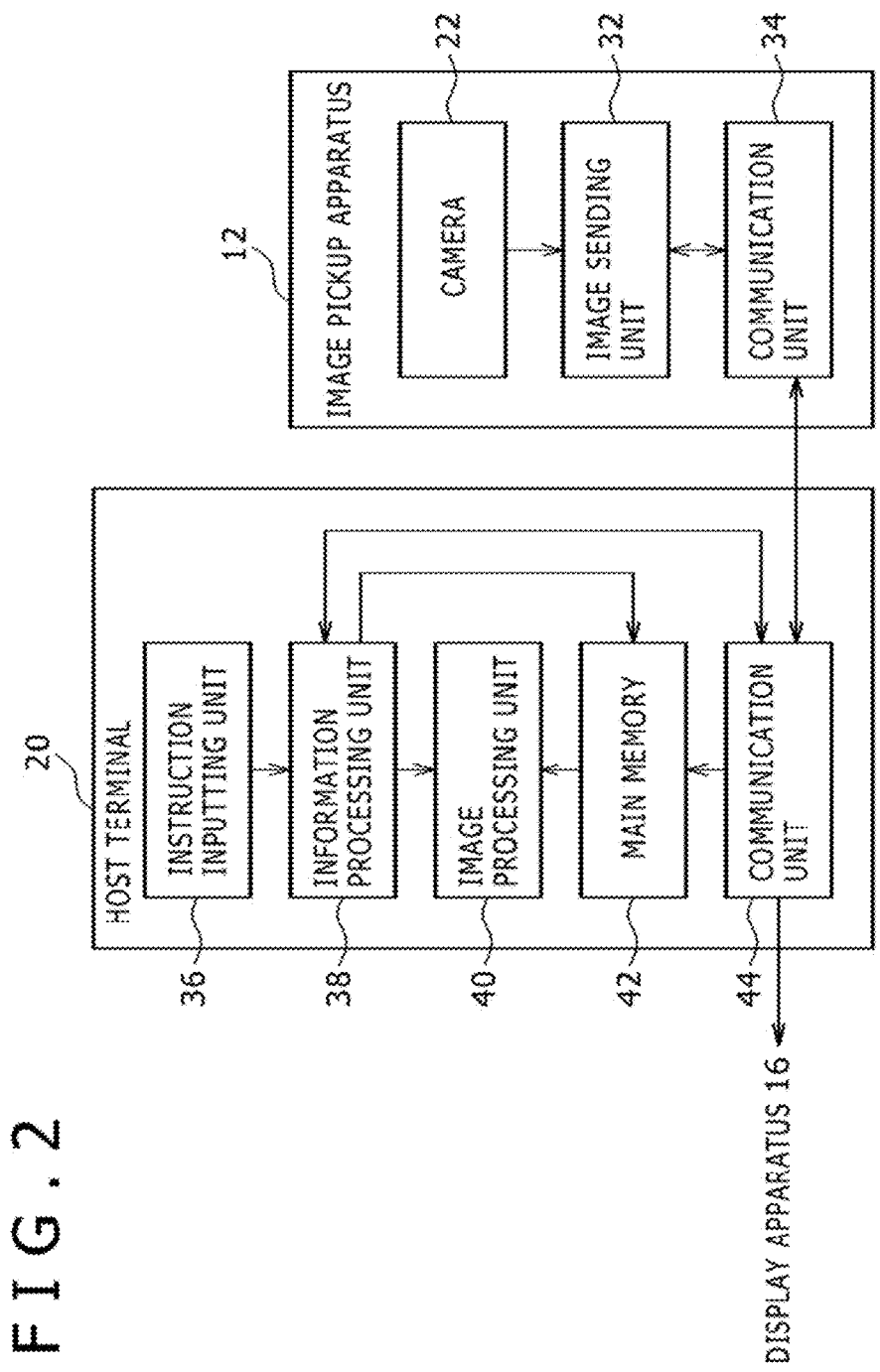
FIG. 2 is a block diagram depicting a configuration of a host terminal and an image pickup apparatus of the information processing system of FIG. 1.

FIG. 2 depicts a configuration of the host terminal 20 and the image pickup apparatus 12. Functional blocks depicted in FIG. 2 and FIGS. 3 to 5 and 14 hereinafter referred to can be implemented from hardware or software. Where the functional blocks are configured from hardware, they can be configured from such components as a central processing unit (CPU), a random access memory (RAM), a read only memory (ROM), a rendering circuit, an image pickup element and so forth. Where the functional blocks are configured from software, they may be implemented by a program loaded from a recording medium or the like into a memory and providing various functions such as a data inputting function, a data retaining function, an image processing function, and a communication function. Accordingly, it can be recognized by those skilled in the art that the functional blocks can be implemented in various forms only from hardware, only from software, or from a combination of hardware and software and are not limited to one of them.

The host terminal 20 includes an instruction inputting unit 36, an information processing unit 38, an image processing unit 40, a main memory 42, and a communication unit 44. The instruction inputting unit 36 acquires an instruction input from the user. The information processing unit 38 totally controls the host terminal 20 and the image pickup apparatus 12 to carry out information processing in accordance with an object. The image processing unit 40 produces an output image to be used for display. The main memory 42 stores image data from the image pickup apparatus 12. The communication unit 44 is an interface which carries out transmission and reception of image data and necessary information to and from the image pickup apparatus 12 and the display apparatus 16.

The instruction inputting unit 36 accepts an instruction input from the user and produces and transmits a process requesting signal corresponding to the instruction input to the information processing unit 38. The instruction inputting unit 36 is implemented by cooperation of a general inputting apparatus such as a button, a keyboard, a mouse, a track ball, and/or a touch panel and a processor that interprets the substance of an operation carried out for the inputting apparatus to produce a process requesting signal, and so forth.

The information processing unit 38 issues a transmission request for image data to the image pickup apparatus 12, a request for image processing to the image processing unit 40 and so forth in accordance with a process requesting signal acquired from the instruction inputting unit 36. Further, the information processing unit 38 develops image data transmitted thereto from the image pickup apparatus 12 in the main memory 42 as hereinafter described in detail. Furthermore, depending upon the substance of a process executed by the information processing system 10, the information processing unit 38 uses image data transmitted thereto from the image pickup apparatus 12 to carry out an image analysis such as stereo matching, tracking of an image pickup object, face detection, or gesture detection. Such image analysis can be implemented by applying a general technology.

The image processing unit 40 uses an image developed in the main memory 42 to carry out image processing in accordance with a request from the information processing unit 38 to produce a display image to be used for display. Data of the produced display image are successively outputted to the display apparatus 16 through the communication unit 44 under the control of the information processing unit 38 and displayed on the display apparatus 16. The communication unit 44 transmits information relating to image data requested by the information processing unit 38 to the image pickup apparatus 12. Further, the communication unit 44 acquires image data transmitted thereto from the image pickup apparatus 12 in accordance with the requesting signal and sends the acquired image data to the information processing unit 38. Furthermore, the communication unit 44 transmits data of an image to be used for display to the display apparatus 16.

The image pickup apparatus 12 includes a camera 22, an image sending unit 32, and a communication unit 34. The camera 22 picks up moving pictures and produces a plurality of kinds of image data. The image sending unit 32 extracts image data requested from the host terminal 20 and produces image data for transmission. The communication unit 34 is an interface for transmission and reception of data from and to the host terminal 20. The camera 22 picks up images of an image pick up object at a predetermined frame rate. Then, the camera 22 reduces the picked up images stepwise to produce image data of a plurality of resolutions for each frame.

The image sending unit 32 extracts, from within image data produced by the camera 22, image data requested by the host terminal 20 and then synthesizes the image data to produce such a virtual synthesis image as hereinafter described. This makes it possible for the host terminal 20 to designate not only a kind of an image but also part of a region of the image so that only the pertaining data can be received. Depending upon a communication method between the host terminal 20 and the image pickup apparatus 12, image data extracted by the image sending unit 32 are suitably packetized.

The communication unit 34 accepts a requesting signal for image data from the host terminal 20 and notifies the image sending unit 32 of the requesting signal. Further, the communication unit 34 transmits image data for transmission produced by the image sending unit 32 to the host terminal 20. The communication unit 34 sends packets to the host terminal 20 in accordance with a predetermined protocol such as, for example, universal serial bus (USB) 3.0. The communication with the host terminal 20 is not limited to wire communication but may be wireless LAN communication such as, for example, IEEE 802.11a/b/g or infrared communication such as infrared data association (IrDA).

Processes to be executed by the image pickup apparatus 12 in the present embodiment are carried out basically in a unit of a pixel string for one horizontal row of an image and is supplied in the unit to a succeeding functional block. As a result, each functional block of the image pickup apparatus 12 may include only a minimal memory capacity, and processes from image pickup to transmission of image data to the host terminal 20 can be carried out with low latency.

Figure 3:
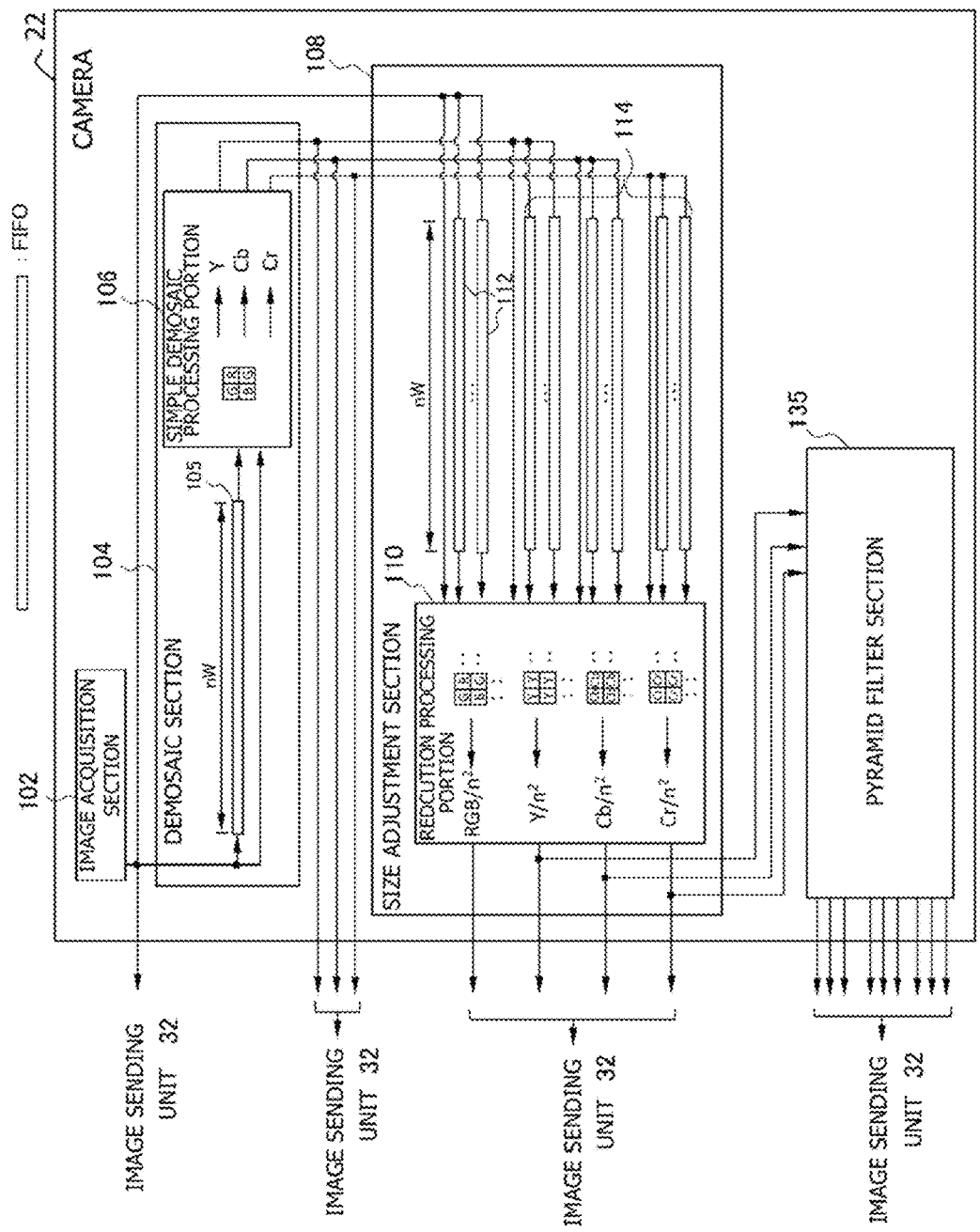
FIG. 3 is a block diagram particularly depicting a configuration of a camera of the image pickup apparatus depicted in FIG. 2.

FIG. 3 particularly depicts a configuration of the camera 22 of the image pickup apparatus 12. The camera 22 includes an image acquisition section 102, a demosaic section 104, a size adjustment section 108, and a pyramid filter section 135. The image acquisition section 102 reads out an image picked up by exposure by the image pickup element at a predetermined rate. This image is a RAW image.

The image acquisition section 102 sends, every time exposure of a pixel string for one horizontal row of a RAW image is completed, the images of the pixel string to the demosaic section 104 and the image sending unit 32. In the following description, it is assumed that, where n is a natural number, a RAW image to be acquired by the image acquisition section 102 has a width of nW pixels in the horizontal direction and a height of nH pixels in the vertical or heightwise direction. This is because it is intended to determine an image prior to reduction to be inputted to the pyramid filter section 135 hereinafter described and having a number W of pixels in the horizontal direction and another number H of pixels in the vertical direction as a reference image. Most simply, n may be set to n=1 and the pyramid filter section 135 may be prepared in accordance with the size of a RAW image which depends upon the resolution of the camera.

On the other hand, in the present embodiment, it is made possible for the configuration of the pyramid filter section 135 to be used as it is in whatever manner the resolution of the camera varies due to technological innovations and so forth thereby to enhance the expandability and make it possible to carry out various processes in a similar manner irrespective of the resolution. Accordingly, the natural number n is determined in response to the resolution of a camera to be introduced. Alternatively, a maximum value of n may be determined within a conceivable range, and the capacity and so forth of the buffer memory may be prepared in response to the maximum value of the natural number n. In this instance, the image acquisition section 102 determines an actual value of n from the image pickup element connected thereto and notifies the other blocks of the actual value of n so that the value of n may be reflected on the contents of processing or a range of use of the buffer memory may be determined.

The demosaic section 104 includes a first in first out (FIFO) buffer 105 having a capacity for nW pixels and a simple demosaic processing portion 106. Pixel data for one horizontal line of a RAW image are inputted to and retained by the FIFO buffer 105 until pixel data for next one horizontal line are inputted to the demosaic section 104. When the simple demosaic processing portion 106 receives pixel data for two horizontal lines, it uses the pixel data to execute a demosaic process of completing, for each pixel, color information based on surrounding pixels thereby to create a full color image.

As well known to those skilled in the art, a large number of methods are available for this demosaic process. Here, a simple demosaic process in which only pixels for two horizontal lines are used can be used satisfactorily. As an example, if a pixel with regard to which corresponding YCbCr values are to be calculated only has a G value, an R value of the pixel is calculated as an average of the R values of the left and right neighboring pixels; the G value of the pixel is determined using the G value as it is; and a B value of the pixel is determined using the B value of a pixel positioned at the upper side or lower side of the pixel. Then, the R, G, and B values are used and substituted into a predetermined conversion expression to calculate YCbCr values. Since such a demosaic process is well known in the art, more detailed description is omitted herein. It is to be noted that the color space of image data produced by processing of the demosaic section 104 and a succeeding block is not limited to the YCbCr space.

The reason why a simple demosaic process can be used satisfactorily is that, where an image of high quality may be required, the RAW image can be used. As a modification to the simple demosaic process, a method of configuring YCbCr values of one pixel from four RGB pixels may be used. In this case, since a demosaic image having a ¼ size of the RAW image is obtained, a first filter 137 of the pyramid filter section 135 hereinafter described can be eliminated.

The simple demosaic processing portion 106 converts, for example, four RGB pixels of 2×2 into YCbCr color signals for four pixels as depicted in FIG. 3 and transmits the YCbCr color signals to the image sending unit 32 and the size adjustment section 108. The simple demosaic processing portion 106 repeats this process for the entire RAW image inputted thereto to produce a demosaic image having widths of nW pixels in the horizontal direction and nH pixels in the vertical direction with respect to the one RAW signal. This image has a size obtained when an image as a reference having W pixels in the horizontal direction and H pixels in the vertical direction is multiplied by n in both of the horizontal and vertical directions. Therefore, the image is hereinafter referred to as $n^2/1$ demosaic image.

The size adjustment section 108 reduces a RAW image acquired by the image acquisition section 102 and an $n^2/1$ demosaic image produced by the demosaic section 104 to 1/n time in both of the horizontal and vertical directions to produce images of the reference image size. To this end, the size adjustment section 108 includes FIFO buffers 112 and 114 having a capacity for nW pixels and a reduction processing portion 110. The FIFO buffer 112 is configured from one or a plurality of FIFO buffers each for retaining pixel data for one horizontal line of a RAW image. The FIFO buffers have a role of retaining, until after pixel data of the last row from among a predetermined number of rows necessary for a single time reduction process are inputted thereto from the image acquisition section 102, pixel data of some other row or rows.

The reduction processing portion 110 uses, at a point of time at which pixel data of the RAW image for the predetermined number of rows are inputted thereto from the image acquisition section 102, the inputted pixel data to carry out a reduction process. A generally used method such as bilinearly interpolation can be used for the reduction process. The number of FIFO buffers which configure the FIFO buffer 112 is determined in accordance with an applied method for the reduction process. For example, where an average value of pixel values for each of a block of n×n pixels is used as one pixel value, in order to produce one row of a reduced image, pixel data for n rows may be required. Therefore, the required number of FIFO buffers is n−1. While, in the example of FIG. 3, more than two FIFO buffers are shown, only one FIFO buffer may be used for reduction to ½ time.

Also the FIFO buffer 114 is configured similarly from one or a plurality of FIFO buffers for individually retaining pixel data for one horizontal line of an $n^2/1$ demosaic image individually corresponding to Y, Cb, and Cr signals. The reduction processing portion 110 uses, at a point of time at which pixel data of an $n^2/1$ demosaic image for the predetermined number of rows are inputted thereto from the demosaic section 104, the inputted pixel data to carry out a reduction process similar to that described hereinabove. As a result of the reduction process, the reduction processing portion 110 outputs pixel data of the reduced RAW image and the Y, Cb, and Cr images after the reduction, which have the widths of W pixels in the horizontal direction and H pixels in the vertical direction, for each one row.

The size adjustment section 108 successively transmits the data to the image sending unit 32 and transmits the data of the Y, Cb, and Cr images also to the pyramid filter section 135. Since the Y, Cb, and Cr images at this time have the reference size, each of them is hereinafter referred to as 1/1 demosaic image. It is to be noted that, where n=1 is satisfied depending upon the resolution of the camera, the reduction process by the size adjustment section 108 may be omitted. The pyramid filter section 135 has a function for hierarchizing a certain image into a plurality of resolutions and outputting resulting images of the resolutions. The pixel data of the Y, Cb, and Cr images of the resolutions produced by the pyramid filter section 135 are transmitted for each one row to the image sending unit 32.

Figure 4:
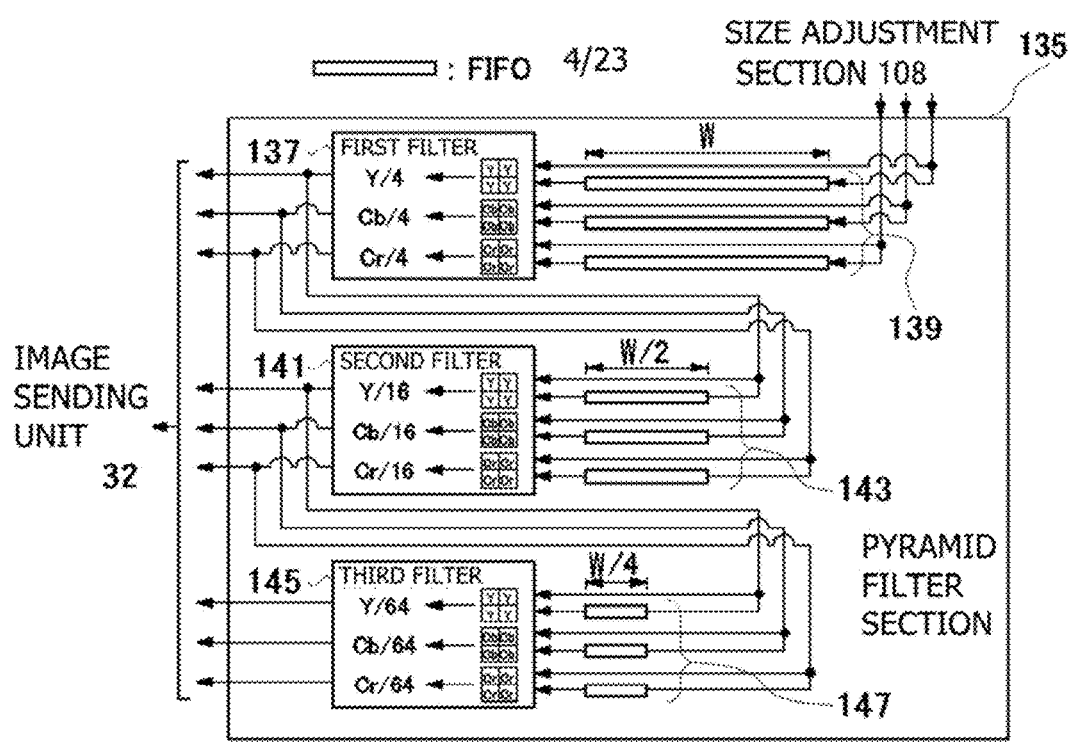
FIG. 4 is a block diagram depicting details of a pyramid filter section depicted in FIG. 3.

FIG. 4 depicts details of the pyramid filter section 135. The pyramid filter section 135 basically includes a number of ¼ reduction filters corresponding to required resolution levels. In FIG. 4, the pyramid filter section 135 includes filters of three hierarchies including a first filter 137, a second filter 141, and a third filter 145. Each filter executes a process of bilinearly interpolating four pixels neighboring with each other to arithmetically operate an average pixel value of the four pixels. Accordingly, the image size after the process is ¼ that of the images before the process. It is to be noted that it can be recognized easily by those skilled in the art that the present embodiment can be implemented similarly even if the number of filters is other than filters of three hierarchies.

At the preceding stage to the first filter 137, a FIFO buffer 139 for W pixels is disposed corresponding to each of the Y, Cb, and Cr signals. The FIFO buffers 139 have a role of retaining YCbCr pixel data for one horizontal line until pixel data for a next horizontal line are inputted thereto from the size adjustment section 108. After pixel data for two horizontal lines are inputted, the first filter 137 averages the Y, Cb, and Cr pixel values for four pixels of 2×2. By repeating this sequence of processes, the 1/1 demosaic image having a length reduced to ½ in both of the horizontal and vertical directions is obtained. As a result, the size is converted into ¼ as a whole. The ¼ demosaic image obtained by the conversion is sent to the image sending unit 32 and passed to the second filter 141 at the succeeding stage.

At the preceding stage to the second filter 141, one FIFO buffer 143 for W/2 pixels is disposed corresponding to each of the Y, Cb, and Cr signals. Also the FIFO buffers 143 have a role of retaining YCbCr pixel data for one horizontal line until pixel data for a next horizontal line are inputted thereto from the first filter 137. After pixel data for two horizontal lines are inputted, the second filter 141 averages the Y, Cb, and Cr pixel values for four pixels of 2×2. By repeating this sequence of processes, a ¼ demosaic image having a length reduced to ½ in both of the horizontal and vertical directions is obtained. As a result, the size is converted into 1/16 as a whole. The 1/16 demosaic image obtained by the conversion is sent to the image sending unit 32 and passed to the third filter 145 at the succeeding stage.

Also the third filter 145 repeats a sequence of processes similar to that described above although a FIFO buffer 147 for W/4 pixels is disposed at the preceding stage thereto. The third filter 145 outputs 1/64 demosaic images to the image sending unit 32. In this manner, image data successively reduced by ¼ are inputted from the filters of the pyramid filter section 135 to the image sending unit 32. It is to be noted that such a pyramid filter as described above is disclosed in European Patent Application Publication No. 0999518 and therefore is known, and therefore, more detailed description of the pyramid filter section is omitted herein.

Figure 5:
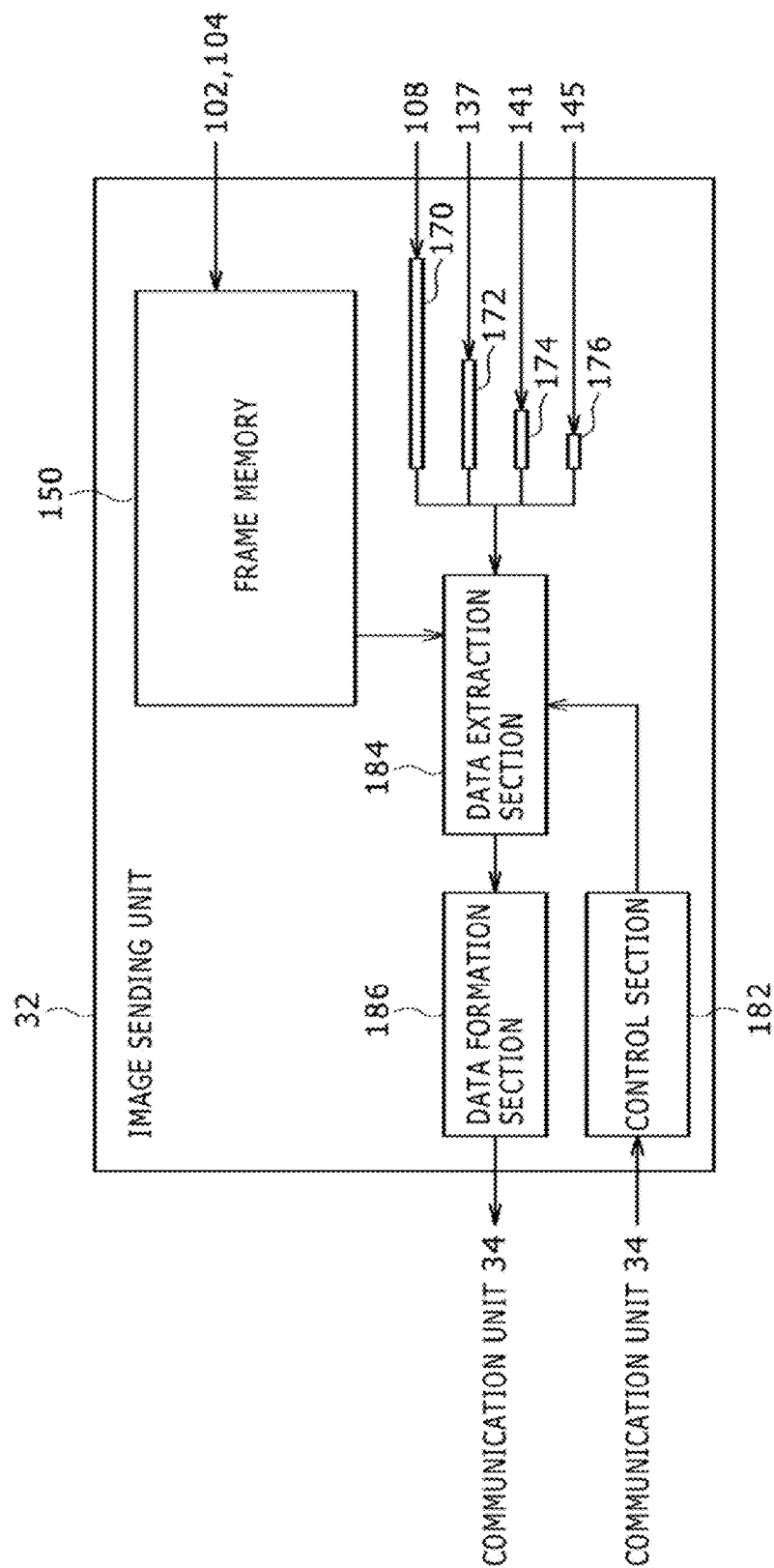
FIG. 5 is a block diagram particularly depicting a configuration of an image sending unit of the image pickup apparatus depicted in FIG. 2.

FIG. 5 particularly depicts a configuration of the image sending unit 32. Referring to FIG. 5, the image sending unit 32 includes a frame memory 150 and FIFO buffers 170, 172, 174, and 176. The frame memory 150 retains data of a RAW image or an $n^2/1$ demosaic image sent thereto from the camera 22 in a unit of a frame. The FIFO buffers 170, 172, 174, and 176 retains a reduced RAW image or 1/1 demosaic image, a ¼ demosaic image, a 1/16 demosaic image, and a 1/64 demosaic image in a unit of a row, respectively. It is to be noted that, although, in FIGS. 3 and 4, Y, Cb, and Cr data signals are represented individually and arrow marks for inputting lines are indicated for the signals, in FIG. 5 and the succeeding figures, the factors are treated as one set and indicated by one arrow mark in order to simplify illustration.

The image sending unit 32 further includes a control section 182, a data extraction section 184, and a data formation section 186. The control section 182 acquires information relating to image data requested from the host terminal 20 through the communication unit 34, and the data extraction section 184 extracts the requested image data. The data formation section 186 forms transmission data. The frame memory 150 retains data of a RAW image sent thereto from the image acquisition section 102 of the camera 22 or of an $n^2/1$ demosaic image sent thereto from the demosaic section 104 in a unit of a frame.

The FIFO buffer 170 retains pixel values for one horizontal line of a reduced RAW image or a 1/1 demosaic image sent thereto from the size adjustment section 108 of the camera 22. The FIFO buffers 172, 174, and 176 retain YCbCr pixel values for one horizontal line of a ¼ demosaic image, a 1/16 demosaic image, and a 1/64 demosaic image sent thereto from the first filter 137, second filter 141, and third filter 145 of the camera 22, respectively.

Accordingly, the FIFO buffers 170, 172, 174, and 176 retain W, W/2, W/4, and W/8 pixel values, respectively. It is to be noted that the number of FIFO buffers is determined in accordance with the number of filters in the pyramid filter section 135 of the camera 22. The control section 182 notifies the data extraction section 184 of information relating to image data to be sent out on the basis of a request signal from the host terminal 20. The control section 182 further receives a signal for requesting starting or ending of image pickup, a signal for designating an image pickup condition and so forth from the host terminal 20. Then, the control section 182 provides the information suitably to the image acquisition section 102 of the camera 22 and so forth to process image pickup processing. However, detailed description of the image pickup control is omitted here because a general technology can be applied to the image pickup control.

When the data extraction section 184 acquires information relating to image data requested by the host terminal 20 from the control section 182, it extracts the requested data from image data stored in the FIFO buffers 170, 172, 174, and 176 and frame memory 150. As described hereinabove, a RAW image, an $n^2/1$ demosaic image, a reduced RAW image, a 1/1 demosaic image, a ¼ demosaic image, a 1/16 demosaic image, and a 1/64 demosaic image are inputted in the order of production thereof from the camera 22 to the image sending unit 32.

At this time, as the image size decreases, the production frequency in the camera 22, and hence, the inputting frequency to the image sending unit 32, decreases. The data extraction section 184 determines outputting timings taking properties of the images relating to the inputting timing or the frequency into consideration so that, from among the image data inputted in various frequencies in such a manner as described above, the requested data are outputted smoothly with lower delay. In particular, the period in which a reduced RAW image or a 1/1 demosaic image stored in the FIFO buffer 170 for one row is produced is determined as a reference period, and a plurality of kinds of image data requested are outputted cyclically in the period. Details of this are hereinafter described.

The processing performed by the image pickup apparatus 12 in the present embodiment is performed in a raster order in which processing from the left to the right is repeated in the downward direction of the image from a start point at the left upper corner of the image. In order to output a result of such scanning with low delay, inputting from the camera 22 to the image sending unit 32 and transmission from the image pickup apparatus 12 to the host terminal 20 are performed using a form of a stream configured by connecting pixel strings, which configure rows, in order. Accordingly, also data outputted from the data extraction section 184 have a form of a stream of pixel values which include data of various images acquired and/or produced by the camera 22 in a mixed manner therein.

It is to be noted that, in FIG. 5, it is assumed that one of a RAW image which can be inputted from the image acquisition section 102 of the camera 22 and an $n^2/1$ demosaic image which can be inputted from the demosaic section 104 is determined as a transmission object. Further, it is assumed that a reduced RAW image and a 1/1 demosaic image which can be inputted from the size adjustment section 108 of the camera 22 is determined as a transmission object. Therefore, only one input line for each of them is depicted. This is because, in many cases, it is sufficient for display or information processing only if one of a RAW image and an $n^2/1$ demosaic image or one of a reduced RAW image and a 1/1 demosaic image is available.

Which one of images is to be selected may be selectively determined in accordance with a request from the host terminal 20 or may otherwise be fixed. In the former case, such a circuit as a multiplexer may be provided on the output side of the camera or on the input side of the image sending unit 32 such that a control section 182 carries out change-over control of the multiplexer or the like in accordance with a request from the host terminal 20. Alternatively, all data may be retained in a frame memory or a FIFO buffer such that a data extraction section 184 extracts only necessary data. In the following description, it is assumed that an $n^2/1$ demosaic image is stored into the frame memory 150 and a 1/1 demosaic image is stored into the FIFO buffer 170.

The data extraction section 184 supplies a data stream of pixel strings in which a plurality of kinds of image data are included in a mixed manner in the order of production to the data formation section 186. The data formation section 186 converts the format of the stream supplied thereto from the data extraction section 184 into a format conforming to a communication protocol with the host terminal 20 so that the stream has a data format with which it can be sent out. Then, the communication unit 34 transmits the steam of the data format to the host terminal 20. For example, the data formation section 186 converts the stream into a packet for each size of an end point of the USB and writes such packets into an internal packet buffer (not depicted). Then, the communication unit 34 successively transfers the packets in the packet buffer to the host terminal 20.

Figure 6:
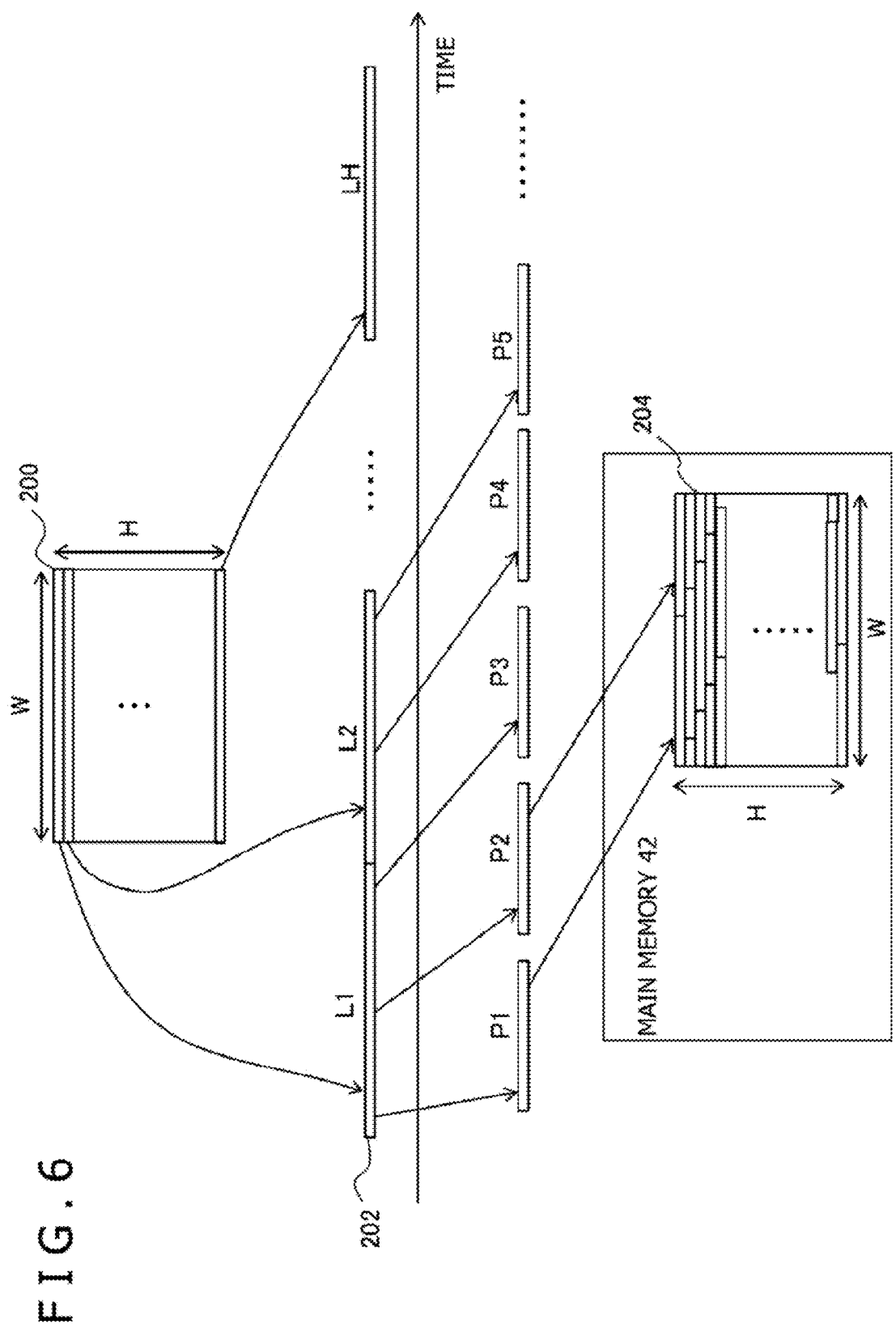
FIG. 6 is a diagrammatic view schematically illustrating a basic transition of the form of data in the image pickup apparatus and the host terminal depicted in FIG. 2.

FIG. 6 schematically illustrates a basic transition of the form of data in the image pickup apparatus 12 and the host terminal 20. Here, as the simplest example, transmission of data of an entire frame image 200 having widths of W pixels in the horizontal direction and H pixels in the vertical direction from the image pickup apparatus 12 to the host terminal 20 is described. As described hereinabove, production, extraction, and transmission of image data are carried out in a raster order of pixels, and pixel data in a unit of a row are successively connected to form a stream to be used for processing.

Data outputted from the data extraction section 184 in such a situation as described above correspond to a stream 202. In FIG. 6, the axis of abscissa of the stream 202 represents lapse of time, and rectangles L1, L2, . . . , LH that configure the stream 202 represent data of pixels in the first row, second row, . . . , Hth row of the original frame image 200, respectively. If the data size of one pixel is d bytes, then the data size of each rectangle is W×d bytes.

The data formation section 186 packetizes the stream 202 for each predetermined size to produce packets P1, P2, P3, P4, P5, . . . . Consequently, the data are transmitted in the order of the packets P1, P2, P3, P4, P5, . . . from the image pickup apparatus 12 to the host terminal 20. The host terminal 20 receives the packets P1, P2, P3, P4, P5, . . . through the communication unit 44 and stores the data of the packets into the main memory 42 under the control of the information processing unit 38.

At this time, the host terminal 20 arranges the data of the packets in the raster order so that they have a width corresponding to the pixel number W in the horizontal direction of the original frame image 200 and the data are developed to successive addresses of W×d×H bytes thereby to reproduce an image 204 corresponding to the frame image 200. In FIG. 6, rectangles that configure the image 204 represent the data of the packets. Depending upon the data size of the packets, pixel data included in one packet may span the tale of a row and the head of a next row of the image 204. The image processing unit 40 processes the image 204 developed in the main memory 42 or synthesizes the image 204 with a different image under the control of the information processing unit 38 to produce an image to be displayed on the display apparatus 16.

Figure 7:
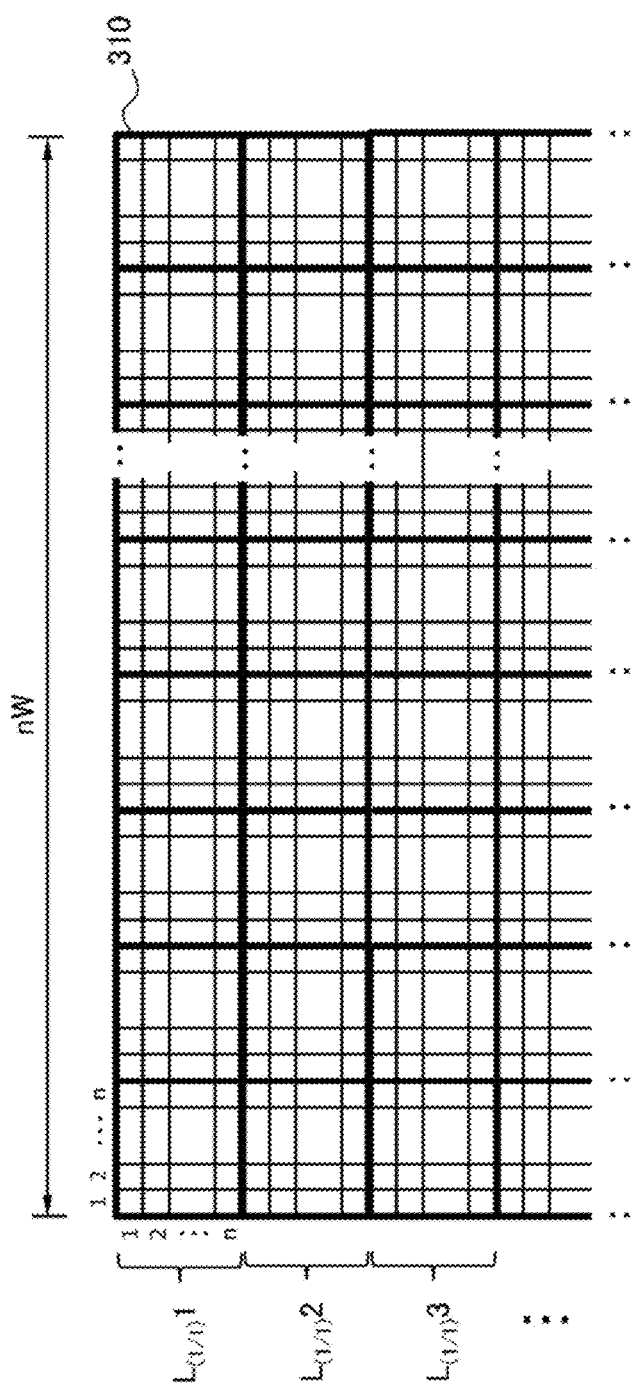
FIG. 7 is a diagrammatic view schematically illustrating a relationship between pixels before and after a reduction process of an image performed by a size adjustment section of a camera depicted in FIG. 2.

FIG. 7 schematically illustrates a relationship between pixels before and after an image reduction process carried out by the size adjustment section 108. An image 310 is a RAW image or an $n^2/1$ demosaic image and has size of nW pixels in the horizontal direction and nH pixels in the vertical direction. A rectangle that is a minimum unit depicted in the inside of the image 310 is a pixel, and row numbers and column numbers from 1 to n are applied to n×n pixels at a left upper corner location of the image. Pixel data of such an image as just described are inputted, in the case of a RAW image, from the image acquisition section 102, but in the case of a demosaic image, from the demosaic section 104, to the size adjustment section 108 for each row.

The size adjustment section 108 retains pixel data of rows inputted previously in the FIFO buffers 112 and 114 until all of pixel data of a predetermined number of rows necessary for a reproduction process are inputted completely. If it is tried to produce one pixel after reduction using a block of n×n pixels of the image 310, then at a point of time at which data of the nth row are inputted, the size adjustment section 108 reads out pixel data from the first to n−1th rows retained in the FIFO buffers. Then, the size adjustment section 108 calculates one pixel value by averaging pixel values for each block or by a like method. A rectangle defined by thick lines of the image 310 of FIG. 7 corresponds to one pixel of a reduced RAW image or a 1/1 demosaic image. This sequence of processes is repeated up to the end of the row of the image to produce pixel data for one row of a reduced RAW image or a 1/1 demosaic image having a width of W pixels.

Further, the sequence of processes is repeated in the vertical direction of the image 310 to produce the entirety of a reduced RAW image or a 1/1 demosaic image reduced to 1/n time in both of the horizontal and vertical directions. Every time the size adjustment section 108 produces pixel data for one row, it successively inputs the pixel data to the image sending unit 32 and the pyramid filter section 135. The 1/1 demosaic images produced in this manner are hereinafter denoted by $L_{(1/1)}1$, $L_{(1/1)}2$, $L_{(1/1)}3$, . . . in order beginning with the first row. It is to be noted that a 1/1 demosaic image can be replaced by a reduced RAW image of the same size by later processing as described hereinabove.

Figure 8:
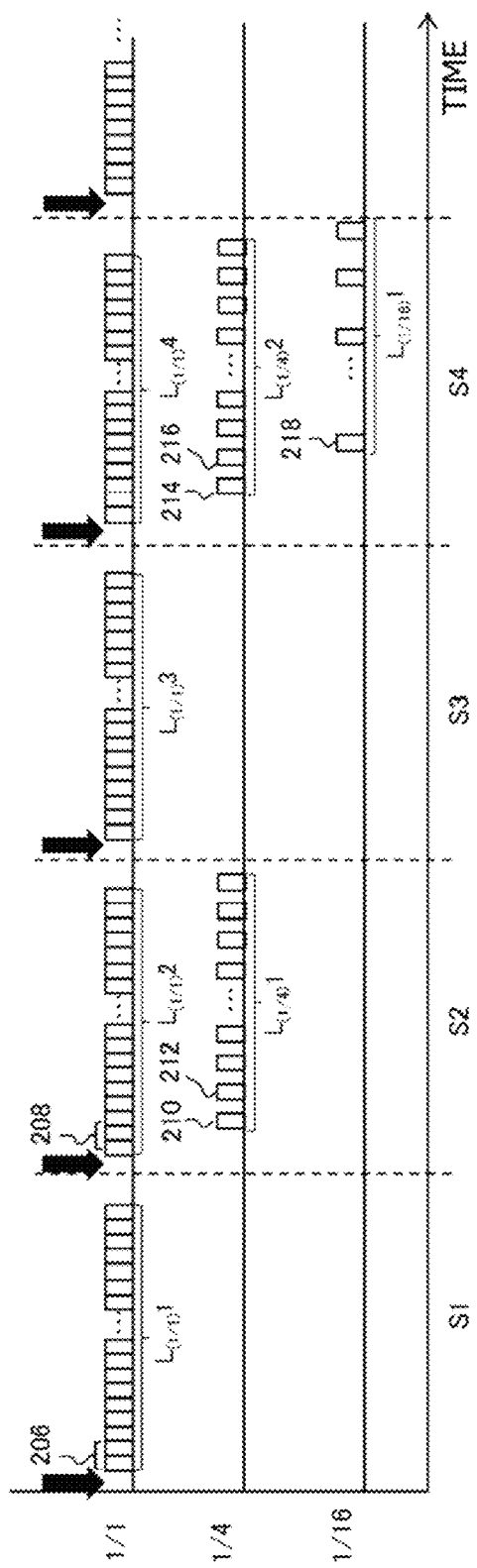
FIG. 8 is a time chart illustrating inputting timings of pixel data of a 1/1 demosaic image, a ¼ demosaic image, and a ¹⁄₁₆ demosaic image to the image sending unit of FIG. 5.

FIG. 8 is a time chart illustrating timings at which pixel data of a 1/1 demosaic image, a 1/4 demosaic image, and a 1/16 demosaic image are inputted from the filters of the size adjustment section 108 and the pyramid filter section 135 to the image sending unit 32. It is to be noted that, while FIG. 8 depicts reduced images including a 1/16 demosaic image, even if a further reduced demosaic image or images equal to or smaller than a 1/64 are added, similar processing can be applied in principle. In FIG. 8, time steps S1, S2, S3, S4, . . . represent periods within which pixel data of the first row, second row, third row, fourth row, . . . of the 1/1 demosaic image are inputted to the image sending unit 32, respectively.

In the present embodiment, a period within which pixel data for one row of the 1/1 demosaic image are inputted is set as a reference time step as described hereinabove, and within each time step, a plurality of image data requested are connected cyclically and outputted. It is to be noted that the size adjustment section 108 begins to produce, simultaneously when pixel data of an $n^2/1$ demosaic image for n−1 rows are stored into the FIFO buffers and then the $n^2/1$ demosaic image for the nth row is inputted, pixel data of a 1/1 demosaic image beginning with the top of the row.

Accordingly, within a period indicated by a thick arrow mark within each time step within which pixel data of each row of a 1/1 demosaic image are inputted, at least pixel data of an $n^2/1$ demosaic image for n−1 rows are inputted to the image sending unit 32, and in FIG. 8, the time axis within the period is shortened. In any case, the time steps S1, S2, S3, S4, . . . correspond also to periods within which pixel data of the $n^2/1$ demosaic image are inputted for n rows. This similarly applies also where a RAW image is selected as input data.

Top, middle, and bottom stages of FIG. 8 indicate input timings of a 1/1 demosaic image, a 1/4 demosaic image, and a 1/16 demosaic image, respectively, and one rectangle corresponds to an input of one pixel. First, within the time step S1, pixel data of the pixel string $L_{(1,1)}1$ of the first line of the 1/1 demosaic image are inputted in order beginning with the pixel at the top of the row. Within this time step, since none of a 1/4 demosaic image and a 1/16 demosaic image is produced as yet, they are not inputted.

Within the next time step S2, pixel data of the pixel string $L_{(1,1)}2$ of the second line of the 1/1 demosaic image are inputted in order beginning with the top of the row. At this time, the pyramid filter section 135 uses the pixel data of the pixel string $L_{(1/1)}1$ of the first line and the pixel string $L_{(1/1)}2$ of the second line of the 1/1 demosaic image to produce a pixel string $L_{(1/4)}1$ of a first line of a 1/4 demosaic image. Therefore, within the time step S2, also the pixel data of the pixel string are inputted.

For example, a pixel value inputted within a period 210 at the left end of the pixel string $L_{(1/4)}1$ of the first line of the 1/4 demosaic image is produced using pixel values of two pixels inputted within a period 206 from within the pixel string $L_{(1/1)}1$ of the first line of the 1/1 demosaic image and pixel values of two pixels within a period 208 from within the pixel string $L_{(1/1)}2$ of the second line. Therefore, within the time step S2, the input timings of the pixel values of the pixel string $L_{(1/4)}1$ are delayed by a period of at least two pixels from the input timings of the pixel values of the corresponding pixels of the pixel string $L_{(1/1)}2$.

Within the next time step S3, pixel data of the pixel string $L_{(1/1)}3$ of the third line of the 1/1 demosaic image are inputted. Within this time step, pixel data for the second line of the 1/4 demosaic image are not produced and a 1/16 demosaic image is not produced as yet, and therefore, none of them is inputted. Within the next time step S4, namely, within a period within which pixel values of the pixel string $L_{(1,1)}4$ of the fourth line of the 1/1 demosaic image are inputted, also pixel data of the pixel string $L_{(1/4)}2$ of the second line of the ¼ demosaic image are inputted similarly as within the time step S2.

Further, the pyramid filter section 135 uses pixel data of the pixel string $L_{(1,4)}1$ of the first line and the pixel string $L_{(1,4)}2$ of the second line of the ¼ demosaic image to produce a pixel string $L_{(1/16)}1$ of the first line of a ¹⁄₁₆ demosaic image. Therefore, within the time step S4, also the pixel data of the pixel string are inputted. For example, pixel values inputted within a first input period 218 from within the pixel string $L_{(1/16)}1$ of the first line of the ¹⁄₁₆ demosaic image are produced using pixel values of two pixels inputted within the period 210 and another period 212 from within the pixel string $L_{(1,4)}1$ of the first line of the ¼ demosaic image and pixel values of two pixels inputted within a period 214 and another period 216 from within the pixel string $L_{(1/4)}2$ of the second line of the ¼ demosaic image.

Therefore, within the time step S4, the input timings of the pixel string $L_{(1/16)}1$ are delayed by a period of at least two pixels from the input timings of the pixel values of the corresponding pixels of the pixel string $L_{(1/4)}2$. Thereafter, inputting of the pixel data of the images is repeated similarly so that all pixel data of the 1/1 demosaic image, the ¼ demosaic image, and the ¹⁄₁₆ demosaic image are inputted to the image sending unit 32.

In this manner, the pixel data of the images are inputted in a raster order as individual streams from the blocks of the camera 22 and the filters of the camera 22. The data extraction section 184 connects, from among the images, only the images requested from the host terminal 20 and the data in the requested region of the images to produce a single stream and outputs the stream to the data formation section 186. At this time, if the data of the pixels in the regions are connected in the order of inputting timings irrespective of the type of the data, then the synthesis process itself is easy. However, when the host terminal 20 thereafter classifies the image data, it is necessary to extract data for each pixel, and this complicates the processing.

Thus, also it seems a possible idea to put pixel data inputted within each time step together for the individual types of images to produce pixel strings and connect the pixel strings to each other. In this case, the size of data to be outputted varies in the follow manner depending upon the time step. For example, within the time step S1 or S3, only pixel data of the $n^2/1$ demosaic image and the 1/1 demosaic image are inputted. However, within the time step S4, further pixel data of the ¼ demosaic image and the ¹⁄₁₆ demosaic image are inputted. Further, the size of data to be outputted varies by a great amount for each time step also depending upon whether or not the data requested from the host terminal 20 include an $n^2/1$ demosaic image or the range of the $n^2/1$ demosaic image.

Therefore, in the present embodiment, with regard to an image which allows a time step within which data is not inputted like a ¼ demosaic image or a ¹⁄₁₆ demosaic image, the time step is utilized to output part of pixel data inputted immediately prior to the time. Further, a surplus time period which appears by outputting only part of data stored in the FIFO buffer within each time step is utilized to successively output the $n^2/1$ demosaic image stored in the frame memory 150 irrespective of whether or not it is inputted within the time step. By such countermeasures, the sizes of data outputted with different time steps can be generally equalized to each other.

Figure 9:
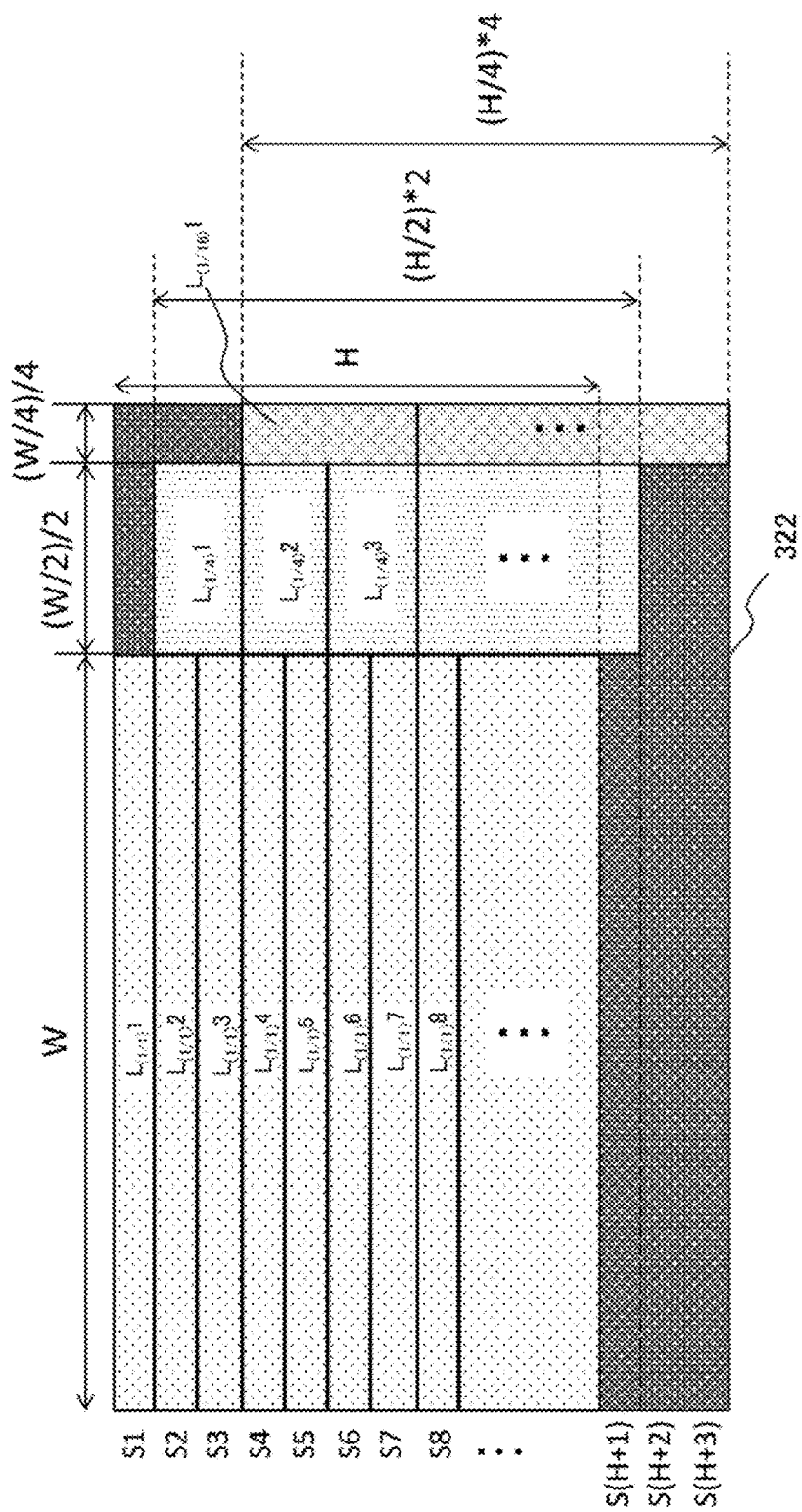
FIG. 9 is a diagrammatic view illustrating a rule applied when a data extraction section depicted in FIG. 5 outputs data stored in a first in first out (FIFO) buffer in a connected relationship to each other.

First, in order to facilitate understandings, a case in which only images stored in the FIFO buffers are made an object of outputting is described. FIG. 9 is a view illustrating a rule when the data extraction section 184 connects and outputs data stored in the FIFO buffers. FIG. 9 depicts, as the most basic example, a case in which the entire regions for a 1/1 demosaic image, a ¼ demosaic image, and a ¹⁄₁₆ demosaic image are outputted. In FIG. 9, S1, S2, S3, . . . denote the time steps described hereinabove with reference to FIG. 8, and pixel data for one row of a 1/1 demosaic image are inputted to the FIFO buffer 170 within each time step.

In FIG. 9, a pixel string outputted from the data extraction section 184 within each time step is indicated by a dotted rectangle which is different among different types of images. As described hereinabove with reference to FIG. 8, within the time step S1, only pixel data of the pixel string $L_{(1/1)}1$ of the first line of the 1/1 demosaic image are stored into the FIFO buffer 170. The data extraction section 184 reads out and outputs the stored pixel data. It is to be noted that each row of the 1/1 demosaic image is configured from W pixels as described hereinabove and as depicted in FIG. 9.

Within the next time step S2, pixel data of the pixel string $L_{(1,1)}2$ of the second line of the 1/1 demosaic image and pixel data of the pixel string $L_{(1,4)}1$ of the first line of the ¼ demosaic image are stored in parallel into the FIFO buffers 170 and 172 at such a timing as illustrated in FIG. 8. The data extraction section 184 first reads out the pixel data of the pixel string $L_{(1,1)}2$ of the second line of the 1/1 demosaic image from the FIFO buffer 170 and outputs the read out pixel data.

After all of the pixel values of the pixel string $L_{(1,1)}2$ of the second line of the 1/1 demosaic image are outputted, the data extraction section 184 reads out the pixel string $L_{(1,4)}1$ of the first line of the ¼ demosaic image from the FIFO buffer 172 and outputs the read out data. At this time, taking an amount of data to be outputted within the succeeding time step S3 into consideration, pixel data of only those pixels in a front half portion from among all pixels of the pixel string $L_{(1,4)}1$ of the first line of the ¼ demosaic image (those pixels in a left half of the image plane) are outputted while the remaining data are continuously retained in the FIFO buffer 172.

Within the next time step S3, only pixel data of the pixel string $L_{(1/1)}3$ of the third line of the 1/1 demosaic image are inputted to the FIFO buffer 170. Therefore, the data extraction section 184 first reads out and outputs the pixel data. Then, the data extraction section 184 reads out those pixel data in the latter half (right half of the image plane) of the pixel string $L_{(1/4)}1$ of the first line of the ¼ demosaic image which have not been outputted as yet from the FIFO buffer 172 and outputs the read out pixel data.

Within the next time step S4, pixel data of the pixel string $L_{(1/1)}4$ of the fourth line of the 1/1 demosaic image and pixel data of the pixel string $L_{(1/4)}2$ of the second line of the ¼ demosaic image and the pixel string $L_{(1/16)}1$ of the first line of the ¹⁄₁₆ demosaic image are inputted in parallel to the FIFO buffers 170, 172, and 174 at such a timing as illustrated in FIG. 8. The data extraction section 184 first reads out the pixel data of the pixel string $L_{(1/1)}4$ of the fourth line of the 1/1 demosaic image from the FIFO buffer 170 and outputs the read out pixel data.

After all of the pixel data of the pixel string $L_{(1/1)}4$ of the fourth line of the 1/1 demosaic image are outputted, the data extraction section 184 reads out a former half of the pixel string $L_{(1/4)}2$ of the second line of the ¼ demosaic image from the FIFO buffer 172 and outputs the read out data. Then, the pixel string $L_{(1/16)}1$ of the first line of the ¹⁄₁₆ demosaic image is read out from the FIFO buffer 174 and outputted. At this time, taking an amount of data to be outputted within the three succeeding time steps S5, S6, and S7 into consideration, the pixel string $L_{(1/16)}1$ of the first line of the 1/16 demosaic image is divided into four, and only pixel data of the first division are outputted. The data of the remaining divisions are stored into the FIFO buffer 174.

Within the next time step S5, only pixel data of the pixel string $L_{(1/1)}5$ of the fifth line of the 1/1 demosaic image are inputted to the FIFO buffer 170. Therefore, the data extraction section 184 first reads out and outputs the pixel data. Then, the data extraction section 184 reads out the pixel data of the latter half of the pixel string $L_{(1/4)}2$ of the second line of the 1/4 demosaic image which have not been outputted as yet from the FIFO buffer 172 and outputs the read out pixel data. Further, the data extraction section 184 outputs the pixel data of the second one of the four divisions of the pixel string $L_{(1/16)}1$ of the first line of the 1/16 demosaic image which have not been outputted as yet.

Similarly, within the next time step S6, the data extraction section 184 outputs pixel data of the pixel string $L_{(1/1)}6$ of the sixth line of the 1/1 demosaic image, pixel data of the former half of the pixel string $L_{(1/4)}3$ of the third line of the 1/4 demosaic image, and pixel data of the third one of the four divisions of the pixel string $L_{(1/16)}1$ of the first line of the 1/16 demosaic image which have not been outputted as yet. Within the next time step S7, the data extraction section 184 outputs pixel data of the pixel string $L_{(1/1)}7$ of the seventh line of the 1/1 demosaic image, pixel data of the latter half of the pixel string $L_{(1/4)}3$ of the third line of the 1/4 demosaic image, and pixel data of the last one of the four divisions of the pixel string $L_{(1/16)}1$ of the first line of the 1/16 demosaic image.

In particular, the pixel string $L_{(1/r)}1$ of the first line of the 1/4 demosaic image is outputted half by half within two time steps including the time steps S2 and S3. The pixel string $L_{(1/16)}1$ of the first line of the 1/16 demosaic image is outputted by one fourth within the four time steps S4, S5, S6, and S7. Where the pixel number of the 1/1 demosaic image in the horizontal direction is W, since the pixel number for one row of the 1/4 demosaic image and the 1/16 demosaic image is W/2 and W/4, respectively, data of (W/2)/2 and (W/4)/4 pixels are outputted per time step as depicted in FIG. 9.

The outputting sequence of processes described above is repeated down to the lowermost row of the image. At this time, at a point of time at which pixel data of the lowermost row of the 1/1 demosaic image are outputted, the pixel data of the latter half of the lowermost row of the 1/4 demosaic image and the pixel data of the remaining three fourths of the lowermost row of the 1/16 demosaic image are not outputted as yet. The data extraction section 184 continues outputting of pixel data until it completes outputting of the data which have not been outputted as yet. In particular, within a time step S(H+1) immediately after outputting of all rows of the 1/1 demosaic image is completed, the pixel data of the latter half of the lowermost row of the 1/4 demosaic image and the pixel data of the second one of the four divisions of the lowermost row of the 1/16 demosaic image are outputted.

At this time, as data for the W pixels having been outputted as data of the 1/1 demosaic image, invalid data are outputted first. Following the invalid data, data of the 1/4 demosaic image and the 1/16 demosaic image are outputted. Within the succeeding two time steps S(H+2) and S(H+3), as data for W+(W/2)/2 pixels having been outputted as data of the 1/1 demosaic image and the 1/4 demosaic image, invalid data are outputted first. Following the invalid data, pixel data of the third and fourth ones of the four divisions of the lowermost row of the 1/16 demosaic image are outputted.

If such an outputting process as described above is applied, then data of W+(W/2)/2+(W/4)/4=21W/16 pixels are outputted within all the time steps except the first three time steps and the last three time steps. Further, in order to output pixel data for one row, the 1/1 demosaic image requires one time step; the 1/4 demosaic image requires two time steps; and the 1/16 demosaic image requires four time steps. Therefore, the number of time steps required to output image data for one frame is given by H=(H/2)×2=(H/4)×4 and is equal with regard to all of the images. The total time step number required to output data for one frame of the three kinds of images is given as H+3.

The data outputted from the data extraction section 184 are an enumeration of pixel data as described hereinabove. However, in two-dimensional data 322 which are image data to be outputted within individual time steps are juxtaposed in a vertical direction as depicted in FIG. 9, data of a plurality of kinds of images configure rectangular regions. Within each time step, the two-dimensional data 322 are transmitted one by one row, and succeeding processes for the two-dimensional data 322 are equivalent to those for the frame image 200 as depicted in FIG. 6. If this is taken into consideration, then the data extraction section 184 produces an image substantially like an image formed from two-dimensional data 322. This virtual two-dimensional data is hereinafter referred to as "synthesis image." If the locality of data of various images in the synthesis image 322 is utilized, then it is facilitated for the host terminal 20 to separate data for each type of an image.

As described hereinabove with reference to FIG. 9, if pixel strings stored in the FIFO buffers are connected to each other in accordance with rules corresponding to the types of images and outputting the resulting pixel string as immediately as possible, then the configuration of the buffers can be minimized and simultaneously the latency after image pickup till data transmission can be reduced to the minimum. However, in the example of FIG. 9, it is presupposed that the entire regions for a 1/1 demosaic image, a 1/4 demosaic image, and a 1/16 demosaic image are included into a synthesis image.

Figure 10:
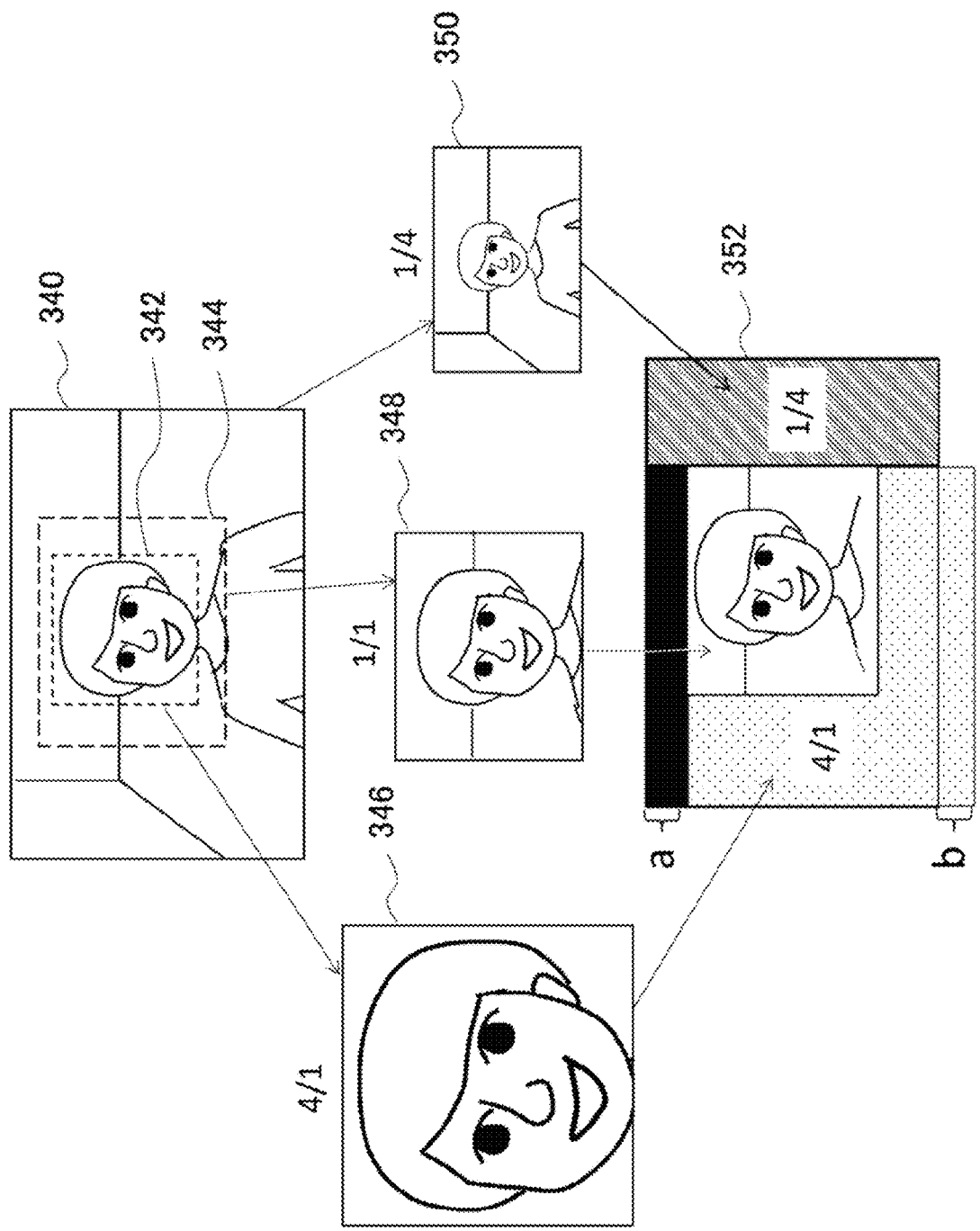
FIG. 10 is a view schematically depicting a manner in which the data extraction section mixes data stored in a frame memory and data stored in the FIFO buffer to produce a synthesis image.

On the other hand, in the present embodiment, it is permitted to transmit only a region requested from the host terminal 20 and data of an $n^2/1$ demosaic image is incorporated into a free space in the synthesis image produced in this manner. FIG. 10 schematically illustrates a manner in which the data extraction section 184 produces a synthesis image such that data stored in the frame memory 150 and data stored in the FIFO buffers are mixed. It is to be noted that, in the following description, in order to avoid complication of description, it is assumed that a 4/1 demosaic image is applied as the $n^2/1$ demosaic image and this 4/1 demosaic image, a 1/1 demosaic image, and a 1/4 demosaic image are determined as an object of outputting. However, it is not intended to restrict the present technology to the configuration just described.

First, the upper stage of FIG. 10 represents a picked up image 340 in a size of a 1/1 demosaic image of a reference size. From the camera 22, a 4/1 demosaic image having a size four times the reference size is inputted to the frame memory 150 and a 1/1 demosaic image of the reference size is inputted to the FIFO buffer 170 while a 1/4 demosaic image having a size 1/4 time the reference size is input to the FIFO buffer 172. Along with this, pixel values are inputted in the order in which they are produced.

Here, it is assumed that a request for a 4/1 demosaic image 346 in a region 342 of the face of a person who is an image pickup object, a 1/1 demosaic image 348 in a region 344 including a region surrounding the region 342, and a ¼ demosaic image 350 of the entire picked up image 340 is issued from the host terminal 20. In this case, since there is no necessity to output the region of the 1/1 demosaic image other than the requested region 344, the input data for the region is discarded. Then, within each time step, data for one row in the region 344 of the 1/1 demosaic image and data for one half row of the ¼ demosaic image are connected and outputted.

As a result, within each time step, a surplus time period appears other than a time period within which necessary data are to be outputted. Therefore, the surplus time period is utilized to output data of the 4/1 demosaic image. In particular, in the synthesis image 352, the region of the 1/1 demosaic image is disposed so as to be contiguous to the region of the ¼ demosaic image, and the left side and the lower side are determined as a region for the 4/1 demosaic image 346. If the data are grasped as a stream to be outputted, then within a time step within which the data of the 1/1 demosaic image to be outputted exist, data of the 4/1 demosaic image 346, data of the 1/1 demosaic image 348, and data of the ¼ demosaic image 350 are cyclically connected and outputted. Within a time step within which the 1/1 demosaic image to be outputted do not exist, data of the 4/1 demosaic image 346 and the data of the ¼ demosaic image 350 are connected and outputted.

In short, while, in regard to the 1/1 demosaic image and the ¼ demosaic image, data of each row are outputted at a substantially same timing within a time step within which the data are produced or within a next time step as a rule, no such constraint condition is provided for outputting of data of the 4/1 demosaic image. Consequently, the image pickup timing of the camera can be utilized without waste to output data and optimize the output data size in each time step.

It is to be noted that, at a stage at which data of a row of a picked up image at a location higher than the region 342 requested as the 4/1 demosaic image, data of the 4/1 demosaic image 346 for the region 342 are not produced as yet, and therefore, there exists not data to be outputted. Accordingly, a region of the synthesis image 352 of FIG. 10 which corresponds to the period a is represented as a blackened invalid region. However, if the period is considered in successive image frames, then it can be utilized for outputting of data of the 4/1 demosaic image of the preceding image frame.

In short, even if production of the last row of the picked up image is completed and production of a next image frame is started, the 4/1 demosaic image continues to be outputted for a predetermined period of time. If this period b is set equal to the period a within which data are not produced as yet and data of a 4/1 demosaic image cannot be outputted, then it is possible to continue to output data without waste within all periods within which successive frames are imaged.

At this time, the data size of the 4/1 demosaic image which can be transmitted per one frame corresponds to the area of an L-shaped region of the synthesis image 352 which is occupied by the image. The size of the synthesis image 352 is determined in response to the image pickup rate of the camera and the transmission bandwidth permitted in communication with the host terminal 20. By suitably distributing the area of the region of each image in the synthesis image on the basis of a result of determination, the size of the region of each image which can be requested by the host terminal 20 is determined.

Figure 11:
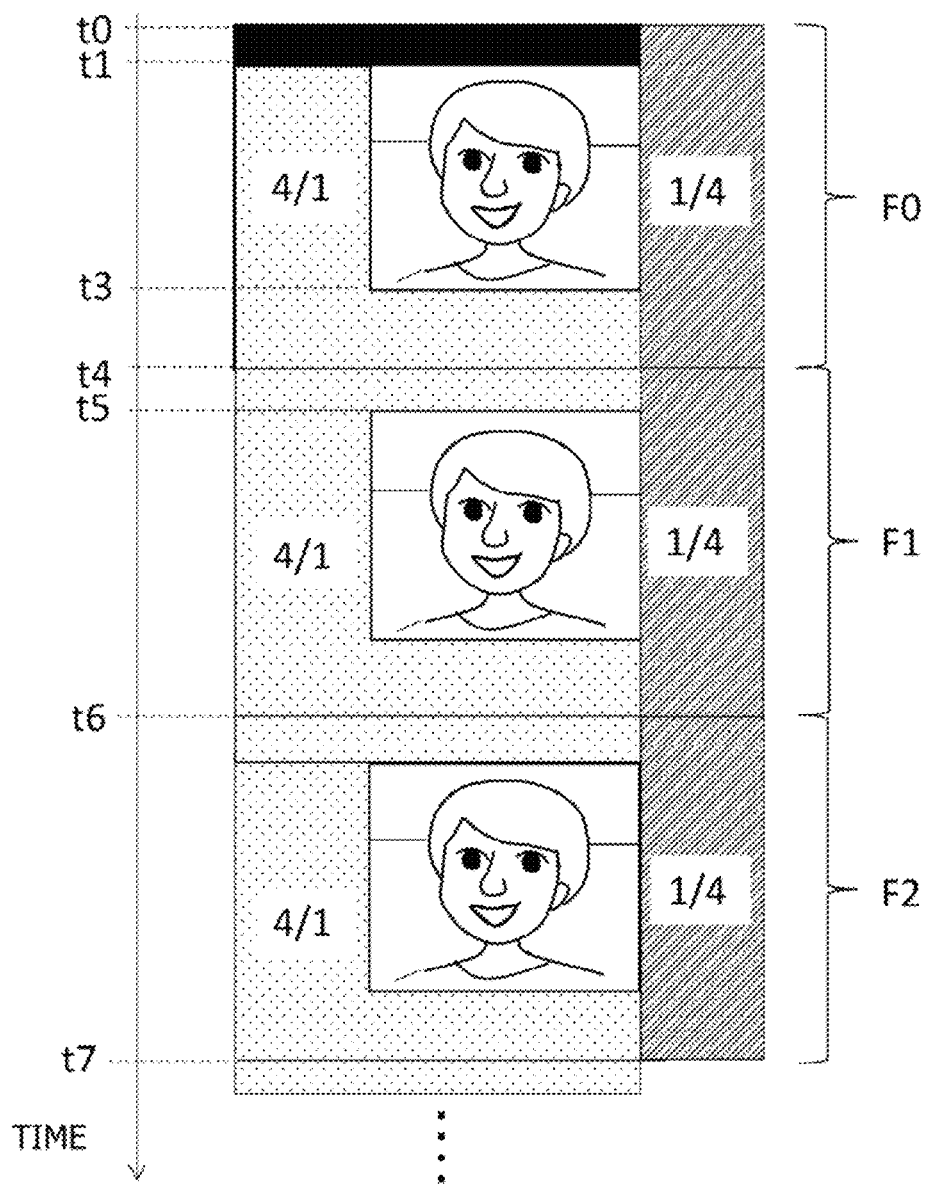
FIG. 11 is a view schematically depicting a manner in which data outputting depicted in FIG. 10 is repetitively performed for a plurality of frames.

FIG. 11 schematically depicts a manner in which data outputting depicted in FIG. 10 is repeated for a plurality of frames. The axis of ordinate indicates lapse of time, and data to be outputted within each time step are indicated horizontally. Times t0, t4, t6, and t7 correspond to timings of a vertical synchronizing signal of the camera, and image data of successive image frames F0, F1, and F2 are produced within time periods between them. In the case of the image frame F0 immediately after image pickup is started, a 4/1 demosaic image and a 1/1 demosaic image to be outputted do not exist within a period from time t0 to time t1. Therefore, invalid data and a ¼ demosaic image are outputted as depicted in FIG. 10.

When the data production reaches a requested region of the 1/1 demosaic image at time t1, outputting of the 1/1 demosaic image is started. Immediately after this, the data production reaches the requested region of the 4/1 demosaic image, and therefore, outputting also of the 4/1 demosaic image is started. Till time t3 at which data outputting of the requested region of the 1/1 demosaic image is completed, the 4/1 demosaic image, 1/1 demosaic image, and ¼ demosaic image are outputted cyclically. It is to be noted that the time at which outputting of the 4/1 demosaic image can be started is, in FIG. 11, substantially same as time t1 although it depends upon the positional relationship with the requested region of the 1/1 demosaic image.

After time t3, the 4/1 demosaic image and the ¼ demosaic image are connected and outputted. Also after outputting of the last row of the ¼ demosaic image is completed at time t4, outputting of the 4/1 demosaic image continues. On the other hand, since data production of the next image frame F1 is started at time t4, outputting of the ¼ demosaic image of the image frame F1 is started. As a result, data of the 4/1 demosaic image of the image frame F0 and the ¼ demosaic image of the image frame F1 are connected and outputted.

If the number of pixels (area in the synthesis image) by which invalid data are outputted within the period from time t0 to time t1 and the number of pixels of the 4/1 demosaic image outputted within the period from time t4 to time t5 are equal to each other, then data outputting of the 4/1 demosaic image of the image frame F0 comes to an end at time t5 at which outputting of the 1/1 demosaic image of the next image frame F1 is started. Accordingly, after time t5, data of the images may be outputted with a configuration of the image frame F0 similar to that after time t1.

The output pixel number permitted for the 4/1 demosaic image depends upon the area of the L-shaped region of the synthesis image as described hereinabove. If the positions of the requested regions of the 4/1 demosaic image and the 1/1 demosaic image move upwardly or downwardly on the picked up image, then also the L-shaped region moves upwardly or downwardly. However, since the area does not change, a 4/1 demosaic image typically having a fixed size can be outputted. By repeating such outputting for successive image frames, requested image data can be outputted with low latency in accordance of the image pickup period of the camera.

Figure 12:
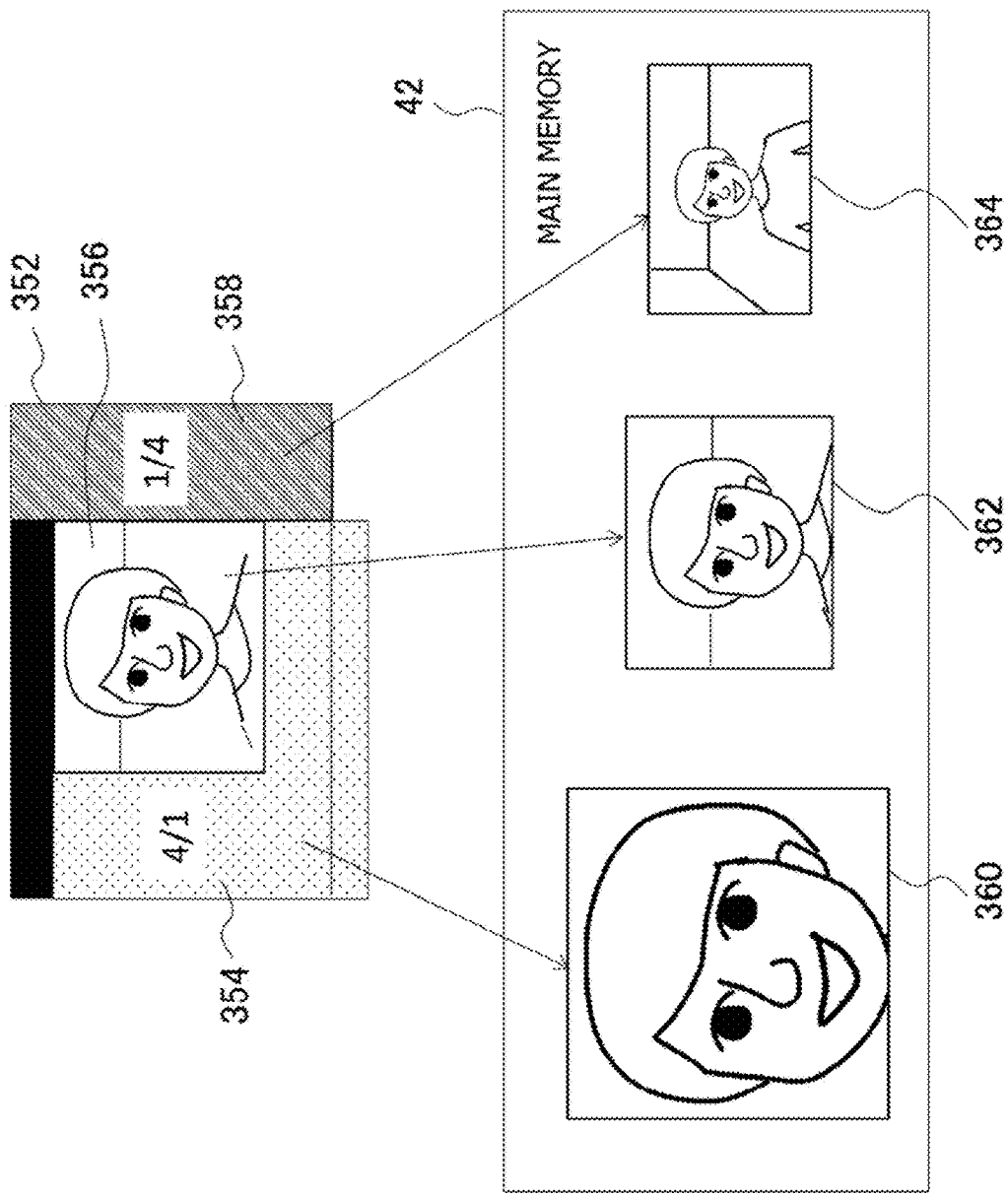
FIG. 12 is a schematic view illustrating a process by the host terminal for image data transmitted from the image pickup apparatus.

FIG. 12 is a view illustrating processing of the host terminal 20 for image data transmitted from the image pickup apparatus 12. The information processing unit 38 of the host terminal 20 cuts the synthesis image 352 into individual images on the basis of the size and the position of the region of each image requested by the host terminal 20 itself and develops the images to successive addresses of the main memory 42. As depicted in FIG. 10, in the synthesis image 352, data of a plurality of kinds of images are disposed individually in the regions 354, 356, and 358.

Of the regions mentioned, the region 354 for a 4/1 demosaic image depends upon the size and the position in the upward and downward direction of the region of the 1/1 demosaic image requested by the host terminal 20 itself. Accordingly, the region 354 is specified on the basis of the information mentioned, and the pixel values in the region are read out in a raster order. Then, by dividing the pixel string in a length in the horizontal direction of the region requested with regard to the 4/1 demosaic image and arranging the divisional strings in a vertical direction, a 4/1 demosaic image 360 can be restored. Similarly, also with regard to the 1/1 demosaic image and the ¼ demosaic image, by reading out the pixel values in a raster order from the corresponding regions 356 and 358 of the synthesis image 352 and arranging them with original sizes, the received data can be restored as images 362 and 364, respectively.

It is to be noted that, since the synthesis image 358 is transmitted as a stream, the information processing unit 38 may cut out data of a plurality of kinds of images in parallel in an arriving order of the data, or the information processing unit 38 may develop the synthesis image 352 as it is into the main memory 42 and distinguish a plurality of kinds of images at a stage at which they are used for image processing or the like. The information processing unit 38 and the image processing unit 40 cut out regions to be used for display further from a separated image or perform working for an image in accordance with the display system of the display apparatus 16. Alternatively, the information processing unit 38 and the image processing unit 40 may render a 3D object on an image in accordance with transition of the progress of a game or perform image analysis such as face recognition or gesture recognition and then perform information processing suitable for a result of the rendering or image analysis.

Figure 13:
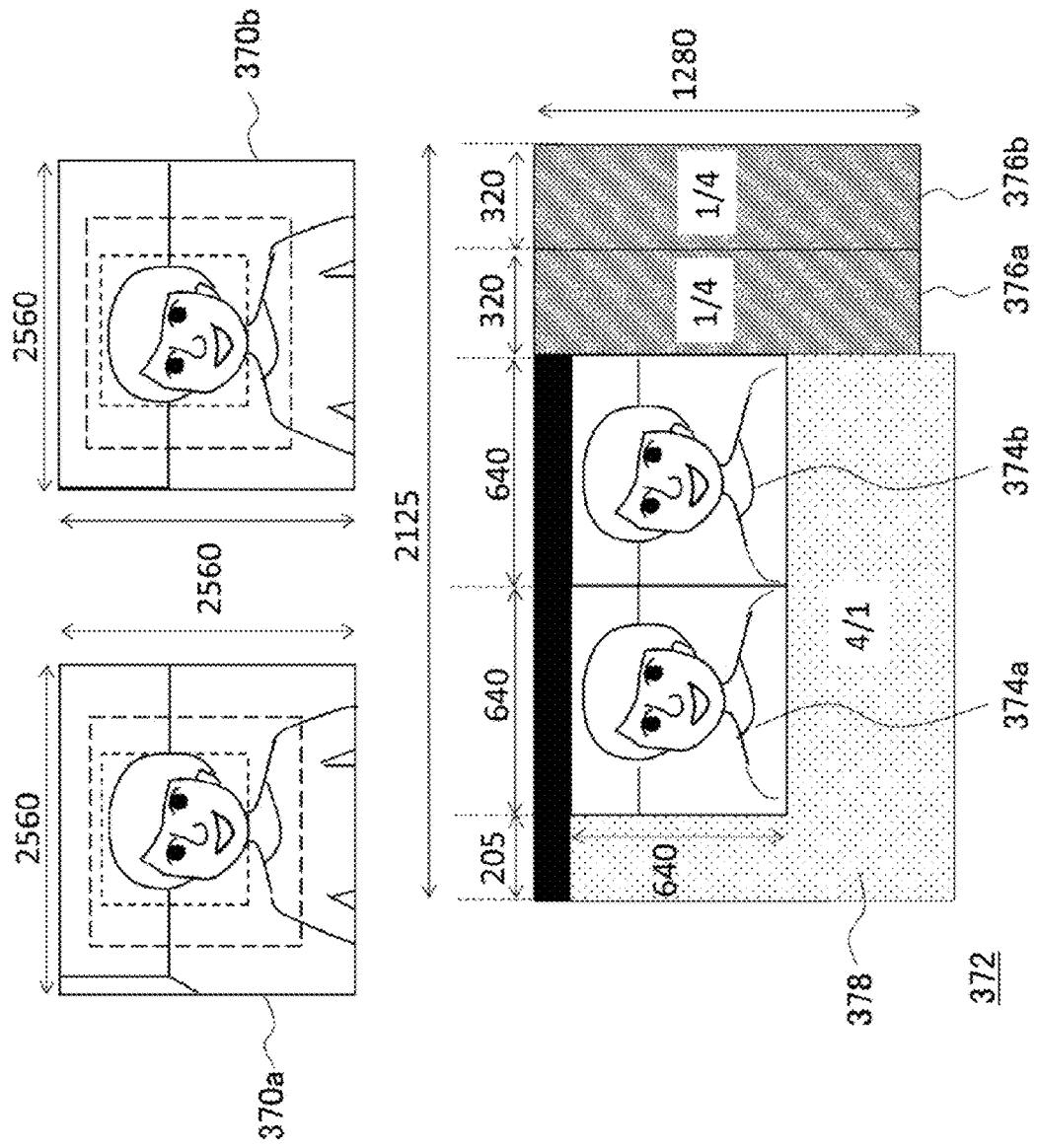
FIG. 13 is a schematic view illustrating a configuration of image data outputted where a stereo camera is provided in the image pickup apparatus.

FIG. 13 is a view depicting a configuration of image data to be outputted where a stereo camera is provided in the image pickup apparatus 12. In this case, each of the two cameras of the stereo camera has a configuration described hereinabove with reference to FIGS. 3 and 4 and transmits image data produced thereby to the image sending unit 32. In the image sending unit 32, each of the frame memory 150, FIFO buffers 170, 172, 174, and 176 depicted in FIG. 5 is provided in pair in a corresponding relationship to the cameras.

At the upper stage of FIG. 13, picked up images 370a and 370b are provided with a size of a 1/1 demosaic image which serves as a reference size. The policy for the data outputting order by the data extraction section 184 is basically similar to that in the case of a single camera. However, upon outputting of a 1/1 demosaic image, left and right image data for one row are connected and outputted. Further, upon outputting of a ¼ demosaic image, the left and right image data for one half row are connected and outputted. As regards a 4/1 demosaic image, when outputting of data in a requested region of one of the images is completed, data in the request region of the other image is outputted continuously.

As a result, when a region similar to that described hereinabove with reference to FIG. 10 is requested, a synthesis image 372 is configured from regions 374a and 374b requested from within the 1/1 demosaic images of the left and right images, regions 376a and 376b of the ¼ demosaic images of the left and right images, and a region 378 for a 4/1 demosaic image. It is to be noted that also the region 378 for a 4/1 demosaic image includes data of the left and right images and the boundary between them makes a line by which the area of the region is divided into two.

For example, a stereo camera having a pair of cameras of 2560×2560 pixels is considered. If an image obtained by reducing a picked up image by each camera to ¼ time is set as a 1/1 demosaic image and a request for one quarter region of the picked up image is issued, then the size of the region is 640×640 pixels (regions 374a and 374b). On the other hand, since the ¼ demosaic image has a general size of 640×640 pixels, if pixel values for one row are divided into those of left and right portions such that they are outputted over two rows as depicted in FIG. 9, then the regions 376a and 376b of the image in the synthesis image 372 have a size of 320×1280 pixels.

The amount of data which can be transmitted within an image pickup period and hence the area permitted in a synthesis image depends upon the transmission speed between the apparatus and the frame rate upon image pickup. If it is assumed that image pickup is performed at the rate of 60 fps and universal serial bus (USB) 3.0 having a transmission speed of 5 Gbps is used, then the size of the synthesis image can be made, for example, 2125×1280 pixels. The area of the 1/1 demosaic image and the ¼ demosaic image is subtracted from the area of the synthesis image to calculate the area of the region 378 to be allocated to the 4/1 demosaic image.

Where the area of the region 378 is divided into two, it is possible to request data of approximately 734×734 pixels per one image as a 4/1 demosaic image. This size has such a comparatively high value as approximately ⅓×⅓ of the picked up image of 2560×2560 pixels and is considered to be within a range within which it is sufficient for a person to sense a definition of an image or for the host terminal 20 to perform some image analysis. In other words, even if image pickup is performed with such high specifications as described above, an effect provided by the height of specifications can be exhibited without expansion of the transmission band.

Figure 14:
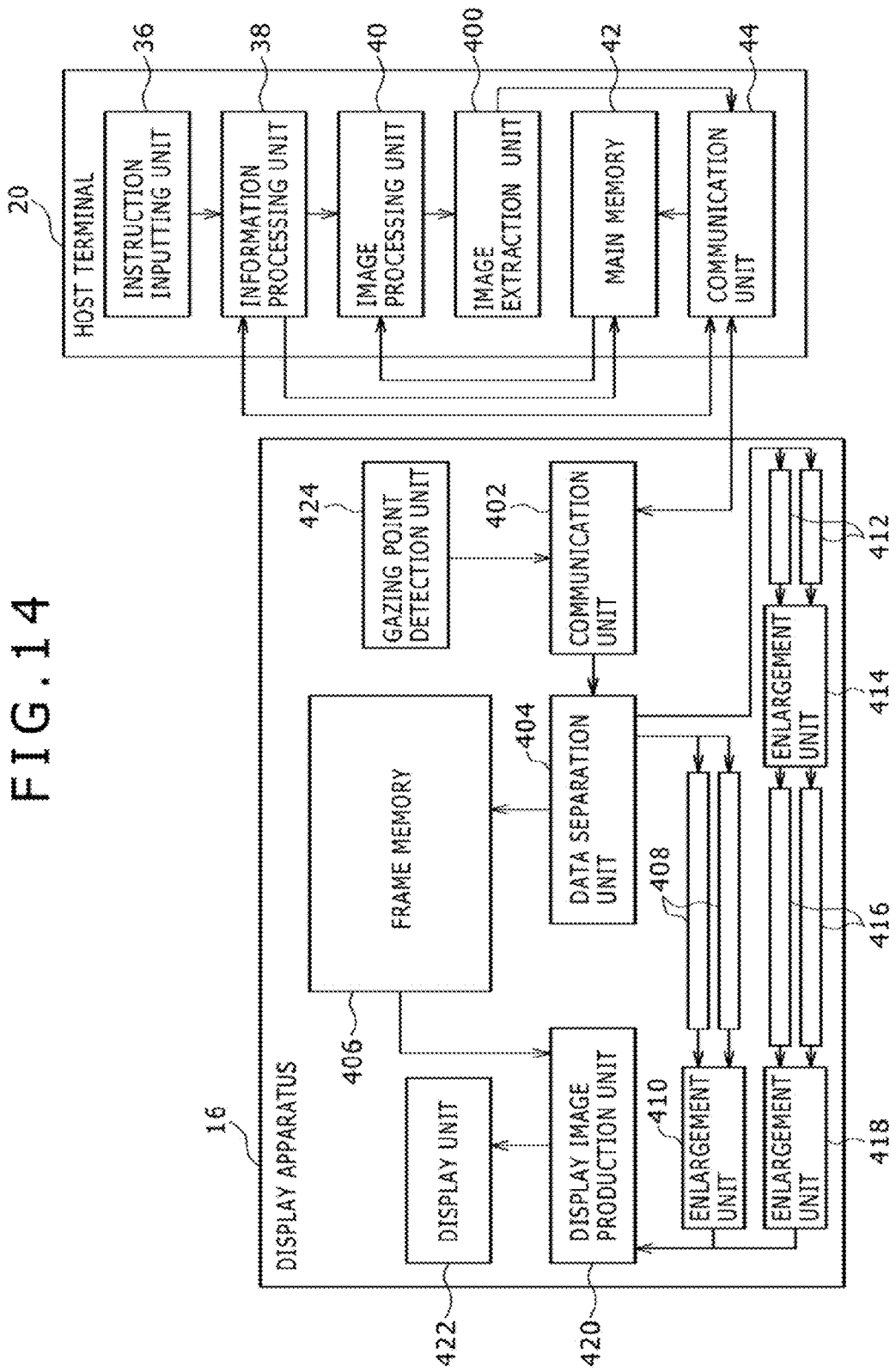
FIG. 14 is a block diagram particularly depicting a configuration of the host terminal and a display apparatus depicted in FIG. 1.

Now, a similar technique is described in regard to a case in which it is applied to transmission of image data from the host terminal 20 to the display apparatus 16. FIG. 14 particularly depicts functions of the host terminal 20 and the display apparatus 16 in this case. It is to be noted that blocks of the host terminal 20 having similar functions to those described hereinabove with reference to FIG. 3 are denoted by like reference characters.

The host terminal 20 includes an instruction inputting unit 36, an information processing unit 38, an image processing unit 40, an image extraction unit 400, a main memory 42, and a communication unit 44. The instruction inputting unit 36 acquires an instruction input from the user. The information processing unit 38 totally controls the host terminal 20 and the display apparatus 16 to carry out information processing in accordance with an object. The image processing unit 40 produces an output image to be used for display. The image extraction unit 400 produces image data for transmission. The main memory 42 stores image data from the image pickup apparatus 12. The communication unit 44 is an interface which carries out transmission and reception of image data and necessary information to and from the image pickup apparatus 12 and the display apparatus 16.

The instruction inputting unit 36, the information processing unit 38, the image processing unit 40, the main memory 42, and the communication unit 44 have functions described hereinabove with reference to FIG. 2. It is to be noted that an image produced by the image processing unit 40 to be used for display may be a picked up image transmitted from the image pickup apparatus 12 or a 3D graphics produced by the host terminal 20 itself. Where a picked up image is transmitted in a plurality of resolutions from the image pickup apparatus 12, the host terminal 20 may only perform some processes for the images. However, where the host terminal 20 is in an environment in which only an image of a single resolution is transmitted from the image pickup apparatus 12 or in which the host terminal 20 itself renders a 3D graphics, the host terminal 20 produces a plurality of images of different resolutions for each frame. This process may be similar to the reduction process performed by the camera 22.

The image extraction unit 400 produces a stream of a synthesis image configured from a plurality of kinds of images to be displayed on the display apparatus 16. The synthesis image is an image in which a plurality of kinds of image data are disposed in individual regions similarly to that described hereinabove with reference to FIGS. 10 and 13 and is a virtual image which is produced and outputted in order as a stream for individual rows. The communication unit 44 transmits the stream to the display apparatus 16. It is to be noted that the timing at which outputting preparations are completed differs from that of the image pickup apparatus 12 depending upon the substance of the image processing by the host terminal 20. Therefore, also the configuration of the synthesis image varies in response to this.

The display apparatus 16 includes a communication unit 402, a data separation unit 404, FIFO buffers 408, 412, and 416, and enlargement units 410, 414, and 418. The communication unit 402 is an interface which performs transmission and reception of image data and necessary information to and from the host terminal 20. The data separation unit 404 separates image data transmitted thereto from the host terminal 20 into data for individual kinds of images. The FIFO buffers 408, 412, and 416 retain part of separated image data or data of enlarged images of them in a unit of a row. The enlargement units 410, 414, and 418 interpolate data stored in the FIFO buffers 408, 412, and 416, respectively, and output data of enlarged images. The display apparatus 16 further includes a frame memory 406, a display image production unit 420, a display unit 422, and a gazing point detection unit 424. The frame memory 406 stores part of image data separated by the data separation unit 404 in a unit of a frame therein. The display image production unit 420 produces a display image using different kinds of images, and the display unit 422 displays the display image produced by the display image production unit 420. The gazing point detection unit 424 detects a location of the display image which is gazed by the user.

The communication unit 402 receives image data in the form of a stream transmitted thereto from the host terminal 20. Further, the communication unit 402 transmits information detected by the gazing point detection unit 424 and relating to a location gazed by the user. The data separation unit 404 separates a plurality of kinds of images configuring the communicated image data and stores the data selectively into the FIFO buffers 408 and 412 and the frame memory 406. In the following, it is assumed that three kinds of images including a 4/1 demosaic image, a 1/1 demosaic image, and a 1/4 demosaic image as exemplified in FIG. 10 are included in a synthesis image. However, it is intended that the present embodiment is not limited to this.

In this case, the 4/1 demosaic image is stored into the frame memory 406; the 1/1 demosaic image is stored into the FIFO buffer 408; and the 1/4 demosaic image is stored into the FIFO buffer 412. Thereafter, by performing an enlargement process for enlarging the 1/1 demosaic image to four times and enlarging the 1/4 demosaic image to 16 times, the size of the images appearing after the enlargement is adjusted to the size of the 4/1 demosaic image.

The FIFO buffers 408 and 412 are individually configured from a plural number of (two in the figure) line buffers for retaining pixel values of one horizontal row of the 1/1 demosaic image and the 1/4 demosaic image. In particular, where the number of pixels of a horizontal row of the 1/1 demosaic image is represented by W, each line buffer of the FIFO buffer 408 retains W pixel values, and each line buffer of the FIFO buffer 412 retains W/2 pixel values.

Figure 15:
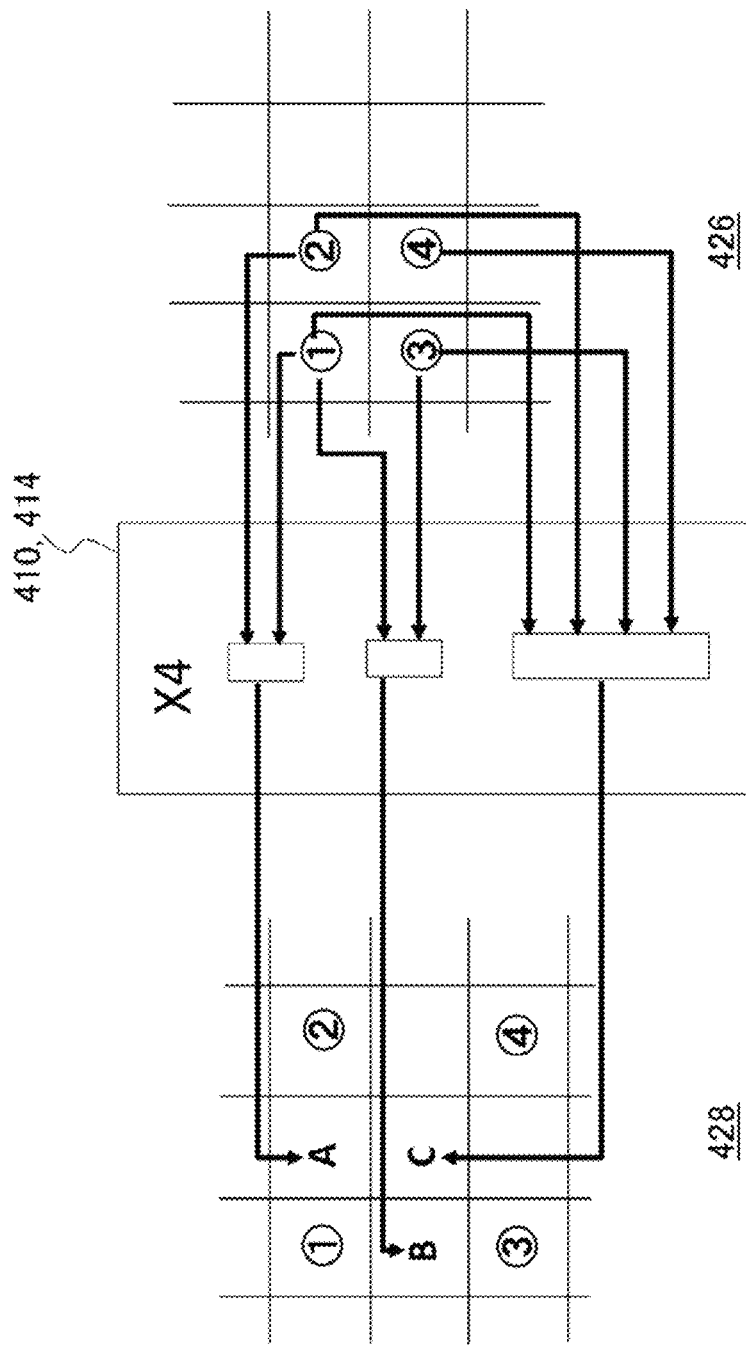
FIG. 15 is a diagrammatic view illustrating an example of an enlargement process of an image by an enlargement unit depicted in FIG. 14.

The enlargement units 410 and 414 interpolate the data stored in the FIFO buffers 408 and 412 with pixels to enlarge the data to twice in both of the vertical and horizontal directions. FIG. 15 illustrates an example of an enlargement process of images by the enlargement units 410 and 414. Particularly, FIG. 15 depicts, at a right side portion thereof, part of pixel strings 426 stored in the FIFO buffers 408 and 412. When an image is to be enlarged to 2×2 times, it is necessary to add one pixel in horizontal, vertical, and oblique directions per one pixel.

The value of pixels to be added in the horizontal direction and the vertical direction is an average value of pixel values of two pixels adjacent in the respective directions. The value of a pixel to be added in an oblique direction is an average value of pixel values of four pixels adjacent in the horizontal direction, vertical direction, and oblique directions. Where a pixel denoted by "1" from within the pixel string 426 in FIG. 15 is selected as an object, between the pixel denoted by "1" and the pixel denoted by "2" which is adjacent on the right side to the pixel denoted by "1," a pixel "A" is added whose pixel value is an average value of the pixel values of the pixels denoted by "1" and "2." Meanwhile, between the pixel denoted by "1" and the pixel denoted by "3" which is adjacent on the lower side of the pixel denoted by "1," a pixel "B" is added whose pixel value is an average value of the pixel values of the two pixels. Further, between the pixel denoted by "1" and the pixel denoted by "4" which is adjacent on the right lower side of the pixel denoted by "1," a pixel "C" is added whose pixel value is an average value of the pixel values of the pixels denoted by "1," "2," "3," and "4."

By repeating the process described above for the pixels of the pixel string 426, a pixel string 428 of an image enlarged to four times is produced. Since, according to the technique just described, one pixel row between two pixel rows is produced from the two pixel rows, the FIFO buffers 408 and 412 are individually configured from two line buffers. However, for the enlargement technique of an image, any other one of general techniques may be adopted. The number of line buffers to configure the FIFO buffers 408 and 412 is determined in accordance with the adopted enlargement technique.

Referring back to FIG. 14, the FIFO buffer 416 is configured from a plurality of (two in FIG. 14) line buffers for retaining pixel values for one horizontal row of a 1/4 demosaic image expanded by the enlargement unit 414. In other words, the FIFO buffer 416 retains W pixel values per one line buffer. The enlargement unit 418 interpolates the data stored in the FIFO buffer 416 with pixels to enlarge the 1/4 demosaic image by two pixels in the vertical direction and the horizontal direction. The enlargement technique by the enlargement unit 418 may be similar to that described hereinabove with reference to FIG. 15. In this case, the FIFO buffer 416 is configured from two line buffers.

The display image production unit 420 synthesizes a 4/1 demosaic image stored in the frame memory 406, a 1/1 demosaic image outputted from the enlargement unit 410 and enlarged to four times, and a ¼ demosaic image outputted from the enlargement unit 418 and enlarged to 16 times to produce one display image. By synthesizing the demosaic images such that a picked up image is re-constructed on the basis of positions of regions represented by the images, a display image having difference levels of detail depending upon regions in the image can be produced.

The display image production unit 420 performs the production process of a display image for each row and outputs the produced display image immediately to the display unit 422. In particular, if the display image production unit 420 acquires data for each row outputted from the enlargement units 410 and 418, then it immediately performs a production process for the row and outputs the resulting data so as to be synchronized with scanning by the display unit 422. Consequently, processing from acquisition of image data by the communication unit 402 to display by the display unit 422 can be performed with low latency. In order to implement such a configuration as described above, the configuration of a synthesis image of the present embodiment is effective.

The gazing point detection unit 424 detects at which location the user gazes the image displayed in this manner. For the detection of a gazing point, any one of existing technologies put to practical use may be adopted. The gazing point detection unit 424 notifies the host terminal 20 of a result of the detection through the communication unit 402. Consequently, the host terminal 20 can determine a region centered at the location gazed by the user in which the resolution is to be raised to highest level and determine another region around the determined region as a region in which the resolution is to be raised to the second highest level. For example, if it is requested to the image pickup apparatus 12 that a 4/1 demosaic image be placed into the former region; a 1/1 demosaic image be placed into the latter region; and a ¼ demosaic image be placed into the overall region, then the image pickup apparatus 12 can use the data of the images to display an image in which the resolution increases toward the location gazed by the user.

It is to be noted, however, that the region in which a high resolution is used is not limited to this, but a region which is significant in an image such as the face of a user who is an image pickup object may be specified by different means. In this case, the function of the gazing point detection unit 424 may be omitted, and the host terminal 20 may specify the region by image analysis. Alternatively, the host terminal 20 itself may produce image data of a plurality of resolutions as described hereinabove. It is to be noted that the host terminal 20 may transmit similar data to a host terminal of a different information processing system through the network 18.

Figure 16:
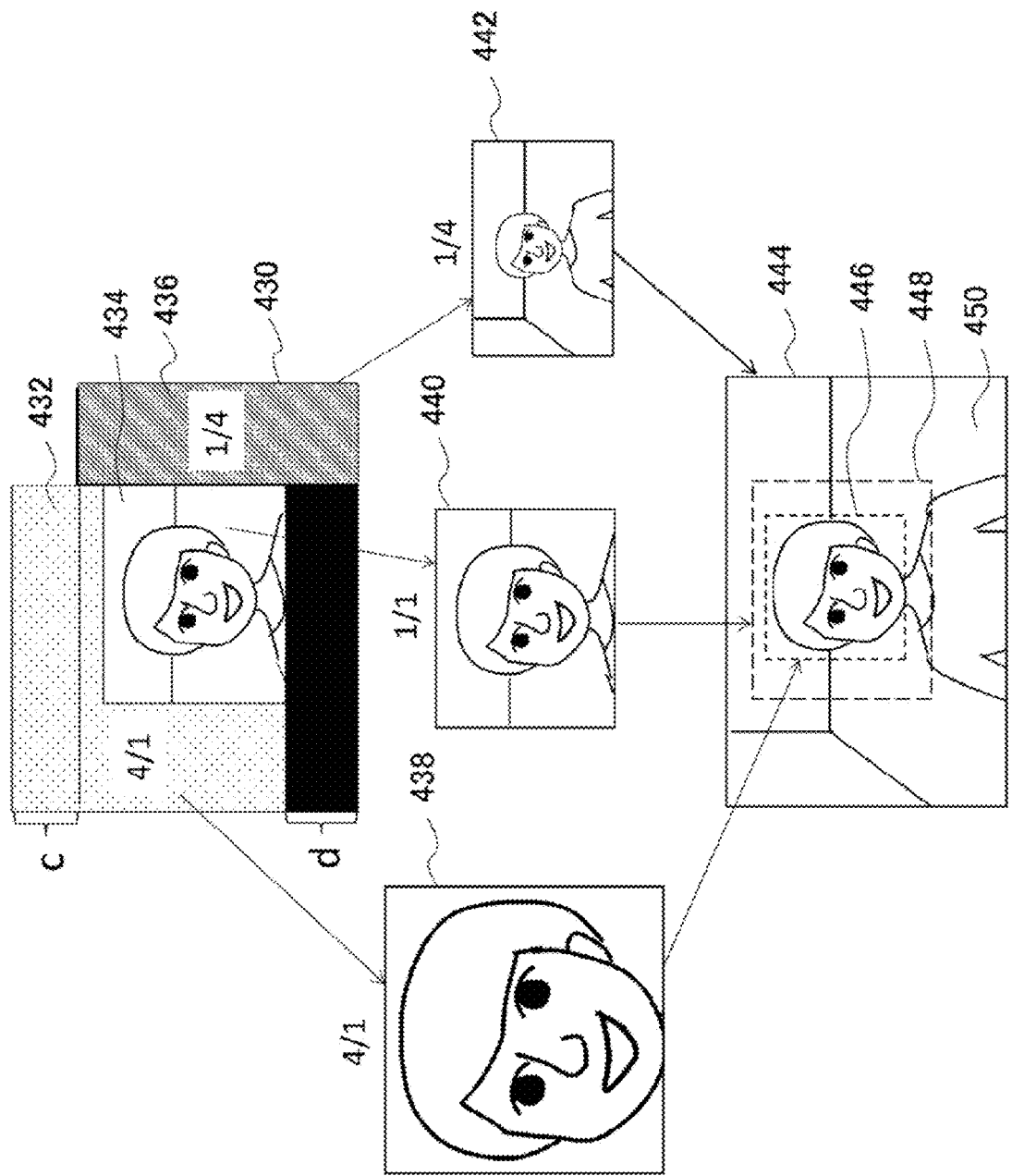
FIG. 16 is a view schematically depicting a manner in which the display apparatus produces a display image using image data transmitted from the host terminal.

FIG. 16 schematically illustrates a manner in which a display image is produced in the display apparatus 16 using image data transmitted from the host terminal 20. The upper stage in FIG. 16 depicts a synthesis image 430 produced by the host terminal 20. The synthesis image 430 has a configuration basically similar to that of a synthesis image produced by the image pickup apparatus 12. The synthesis image 430 has a region 432 for a 4/1 demosaic image, a region 434 for a 1/1 demosaic image, and a region 436 for a ¼ demosaic image disposed separately from each other therein.

The synthesis image 430 is inputted in a raster order from the host terminal 20 to the display apparatus 16. The data separation unit 404 stores a 4/1 demosaic image 438 from among the images for the regions into the frame memory 406 and stores a 1/1 demosaic image 440 and a ¼ demosaic image 442 into the FIFO buffer 408 and the FIFO buffer 412, respectively. Then, the 1/1 demosaic image is enlarged to four times and the ¼ demosaic image is enlarged to 16 times. Then, the demosaic images are synthesized at the original positions in the picked up image to produce a display image 444. It is to be noted that, in FIG. 16, the display image 444 is depicted in a reduced scale.

As a result, the display image 444 is an image in which a region 446 for a 4/1 demosaic image, a region 448 for a 1/1 demosaic image, and a region 450 for a ¼ demosaic image are synthesized and the resolution becomes higher toward a significant portion such as the face. It is to be noted that, while, in the display image 444 depicted in FIG. 16, the region 446 for a 4/1 demosaic image and the region 448 for a 1/1 demosaic image have rectangular shapes which reflect the images before the synthesis as they are. However, alpha blending may be applied so that the synthesis may look more naturally. For example, circular or elliptical alpha masks which individually inscribe the region of an image are prepared such that the inside thereof is transparent; the outside thereof is opaque; and the boundary thereof is semi-transparent. By using the masks upon synthesis, such a natural image that the regions have circular or elliptical shapes and the level of detail gradually changes on the boundary between the regions can be displayed.

In such an image display procedure as described above, if it is taken into consideration that the display image 444 is displayed in a raster order on the display unit 422, corresponding rows of a 1/1 demosaic image and a ¼ demosaic image are preferably inputted at the same time. Further, image data are transmitted preferably with a uniform size within all periods. As a result, it is most efficient to produce and transmit a synthesis image with arrangement same as that of the synthesis image produced by the image pickup apparatus 12. Consequently, it becomes possible to perform processing in an inputting order of a stream transmitted from the host terminal 20, and it becomes possible to display with low delay with respect to transmission from the host terminal 20.

It is to be noted that, in order to display a 4/1 demosaic image of the same frame in a timed relationship with this display, it is significant that, at a timing at which each row including the region 446 for a 4/1 demosaic image in the display image 444, data of each row of the 4/1 demosaic image have been stored already into the frame memory 406. Accordingly, the synthesis image 430 in this case is configured different from a synthesis image produced by the image pickup apparatus 12 such that the region 432 of a 4/1 demosaic image of the same frame exists on the upper side of the region 434 of a 1/1 demosaic image.

In particular, data of a 4/1 demosaic image are transmitted prior to outputting of a 1/1 demosaic image and a ¼ demosaic image. It is to be noted that, also in such a case as just described, if the size of the region for a 4/1 demosaic image is determined such that a period d within which the 4/1 demosaic image is outputted and the period d within which only the ¼ demosaic image is outputted are equal to each other, then data of an image necessary for display of each frame can be transmitted in a cycle corresponding to the output rate of the display apparatus.

On the other hand, as occasion demands, the synthesis image to be transmitted from the host terminal 20 may be configured similarly to the synthesis image to be transmitted from the image pickup apparatus 12 to the host terminal 20. In particular, the start point of outputting of a 4/1 demosaic image may be set to the same timing as that of the start point of outputting of a 1/1 demosaic image so as to allow sending in chase. Where input data from the image pickup apparatus 12 are to be displayed immediately as hereinafter described, the latter mode is effective because priority is given to the outputting speed of the 1/1 demosaic image and the ¼ demosaic image.

Figure 17:
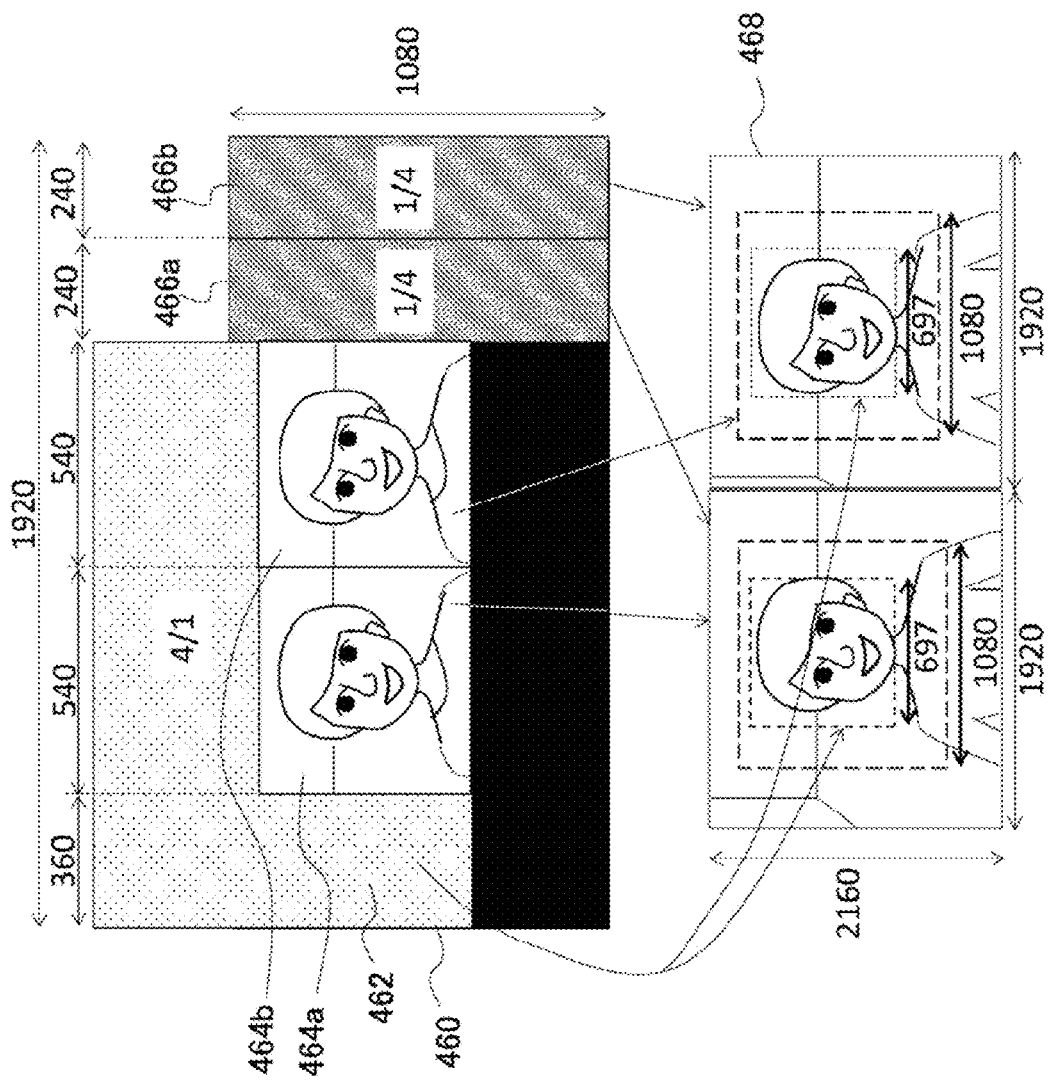
FIG. 17 is a view schematically depicting a manner in which a display image is produced from image data transmitted from the host terminal.

FIG. 17 schematically depicts a manner in which, where a stereo camera is provided in the image pickup apparatus 12 and left and right images are used in a display image, a display image is produced from image data transmitted from the host terminal 20. It is to be noted that this mode assumes a case in which left and right images based on images picked up by the stereo camera and having a parallax therebetween are displayed in left and right regions into which the display screen image is divided. In this case, from among the functional blocks of the display apparatus 16 depicted in FIG. 14, the frame memory 406, FIFO buffers 408, 412, and 416, and enlargement units 410, 414, and 418 are provided for each of left and right images. Further, the display image production unit 420 performs a process for outputting a left side image of the display screen first and then outputting a right side image of the display screen for each row.

It is to be noted that, though not depicted, the image in this case has been subjected to an image process so as to be compatible with the display system of the display unit of the host terminal 20. To the image process, a technology of a head-mounted display unit which has been put into practical use can be applied suitably. A synthesis image 460 in the present mode is configured from a region 462 for a 4/1 demosaic image, regions 464a and 464b for left and right 1/1 demosaic images, and regions 466a and 466b for left and right ¼ demosaic images. It is to be noted that, also in the region 462 for a 4/1 demosaic image, images of left and right images are included, and the boundary between them becomes a line along which the area of the region is divided into two.

When the synthesis image 460 is transmitted in the form of a stream from the host terminal 20, it is separated into data of three images for each of the left and right images and hence of totaling six images. Then, a process for enlarging a 1/1 demosaic image and a ¼ demosaic image to four times and 16 times, respectively, and synthesizing the enlarged images with the 4/1 demosaic image is performed for each of the left and right images. Then, for each row for which the processing is completed, the left and right image data are outputted in a horizontally connected relationship to each other so that a display image 468 is displayed on the display unit 422.

Also in this case, similarly as in the case described hereinabove with reference to FIG. 16, by successively outputting, in the process to successively output data after enlargement of a ¼ demosaic image representative of an entire image in a raster order, the data after the enlargement of the image when a region for a 1/1 demosaic image is reached but by successively outputting, in the process, the data of the image when a region for a 4/1 demosaic image is reached, the image can be displayed with low latency with respect to the data transmission from the host terminal 20. Further, since there is no necessity to deploy the entire region of the 1/1 demosaic image and the ¼ demosaic image in the display apparatus 16, the required number of line buffers can be reduced.

If it is assumed that the resolution of the display screen of the display unit 422 is 1920×2160 pixels with regard to each of the left and right images and the entire region is displayed in the region of the pixels using a ¼ demosaic image, then the size of the regions 466a and 466b of the ¼ demosaic image of the synthesis image 460 is 240×1080 pixels. Further, if the size upon display of each of the 1/1 demosaic images is 1080×1080 pixels, then the size of each of the regions 464a and 464b of the 1/1 demosaic image of the synthesis image 460 is 540×540 pixels.

If it is assumed that the display rate of the display apparatus 16 is 60 fps and high-definition multimedia interface (HDMI) (registered trademark) is used as transmission means between the host terminal 20 and the image pickup apparatus 12, then the size of the synthesis image can be made, for example, 1920×1080 pixels. If the areas of the 1/1 demosaic image and the ¼ demosaic image are subtracted from the area of the pixels and the difference area is divided into areas for the left and right images, then the region of 697×697 pixels per one image can be represented by a detailed image of the 4/1 demosaic image. Since the range within which a person can intentionally observe is restrictive, it is considered that, if the region of the size, for example, centered at the gazing point is definite, then the effect of achievement of a higher resolution can be achieved sufficiently.

Figure 18:
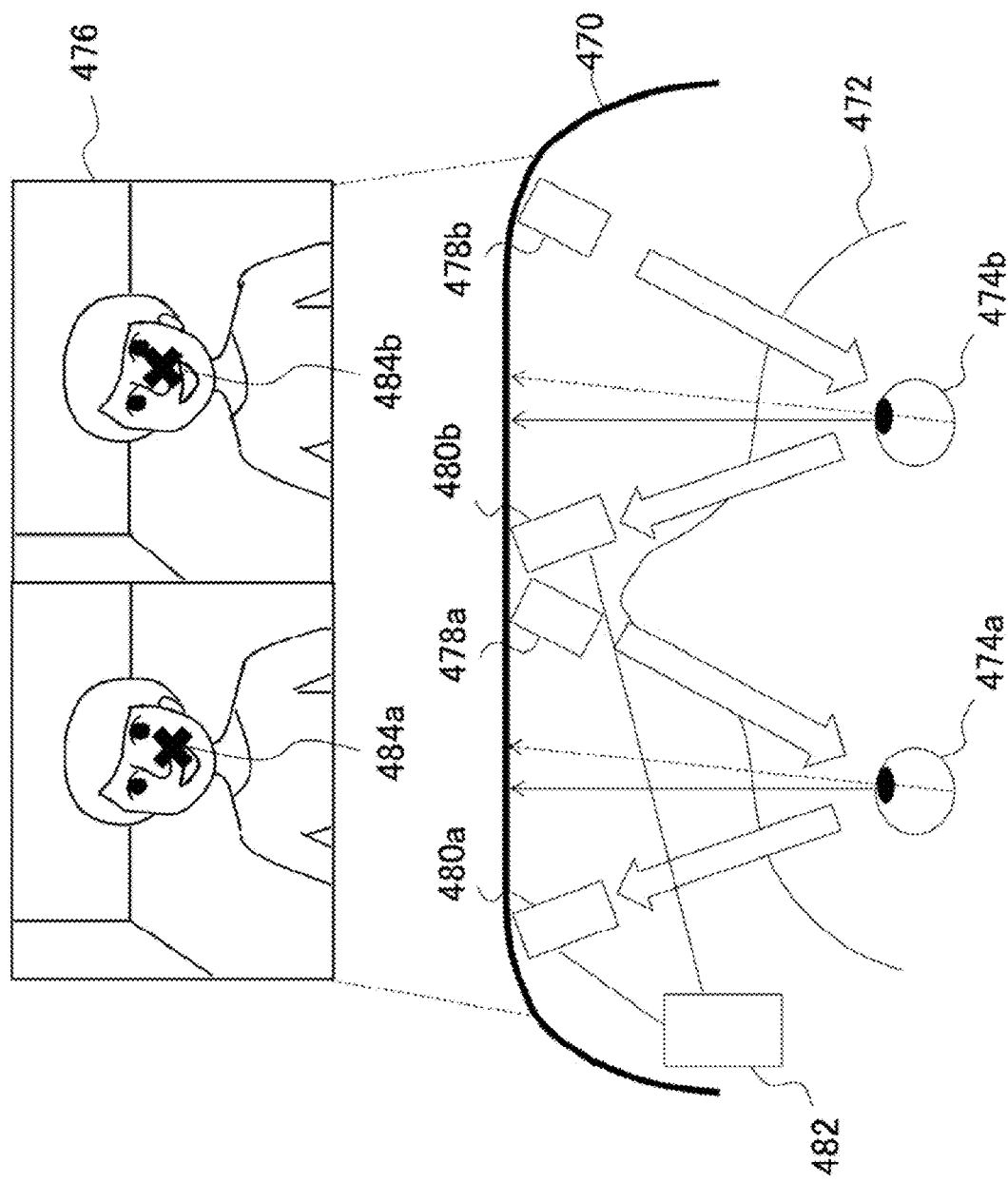
FIG. 18 is a view depicting an example of a configuration of a gazing point detection unit depicted in FIG. 14.

FIG. 18 depicts an example of a configuration of the gazing point detection unit 424. The lower stage of FIG. 18 schematically represents a manner when a head-mounted display unit 470 and a head 472 of the user who wears the head-mounted display unit 470 are viewed from above. Such a display image 476 as depicted at the upper stage of FIG. 18 is displayed on the head-mounted display unit 470, and the user would observe the display image 476 with the left and right eyes 474a and 474b thereof. Here, as the gazing point detection unit 424, infrared LEDs 478a and 478b, infrared cameras or position sensitive detector (PSD) sensors 480a and 480b, and an image analysis unit 482 are provided.

The infrared LEDs 478a and 478b irradiate infrared rays to the left and right eyes 474a and 474b of the user, respectively. The infrared cameras or PSD sensors 480a and 480b pick up an image of the left and right eyes 474a and 474b of the user and supply data of the picked up images to the image analysis unit 482. The image analysis unit 482 specifies, from the picked up images of the left and right eyes, the reflection positions of the infrared rays on the corneas and the positions of the pupils and specifies the line of sight of the user from the positional relationship of the positions. This technique has been put to practical use as a corneal reflection method in the field of the line-of-sight detection technology. It is to be noted that the technique for detecting a line of sight is not limited to this, but any of general techniques such as a technique, for example, of picking up an image of the left and right eyes with a visible ray camera and specifying a line of sight from a positional relationship of the inner corners and the irises of the eyes may be adopted.

The image analysis unit 482 decides crossing points 484a and 484b between the lines of sight detected in this manner and the display image 476 as a gazing point of the user and detects the position coordinates of the gazing point. The information of the position coordinates of the gazing point is transmitted to the host terminal 20. Consequently, the host terminal 20 can determine a region to be represented by a 4/1 demosaic image and another region to be represented by a 1/1 demosaic image around the former region. Then, a request only for the data in the regions is issued as in the mode described hereinabove or the host terminal 20 itself performs a cutting out process from a plurality of picked up images of different resolutions to transmit data of the image including the regions to the display apparatus 16. By performing this process continuously, a display image in which the location of a high resolution moves in response to the movement of the gazing point can be displayed with low latency.

Figure 19:
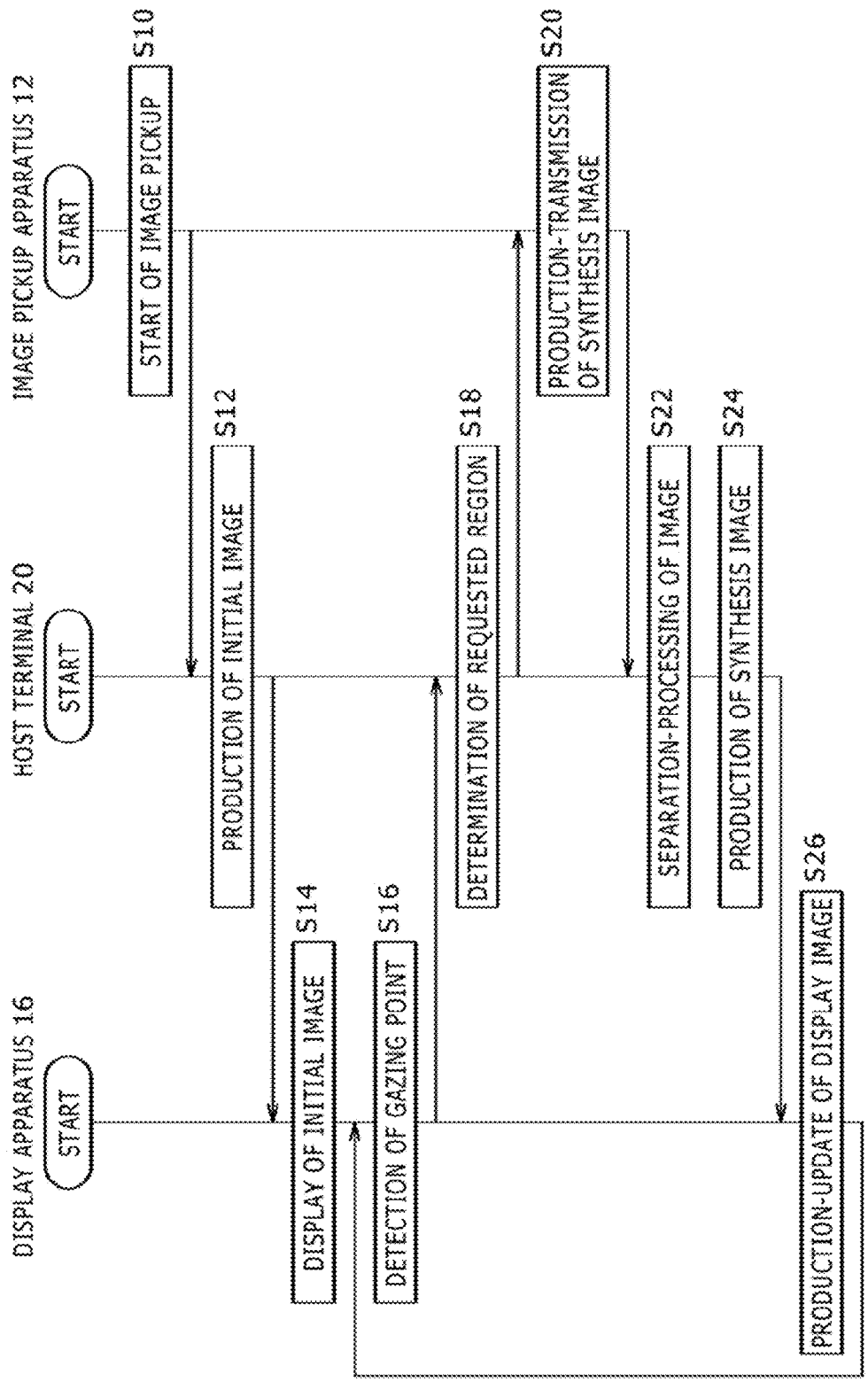
FIG. 19 is a flow chart illustrating a processing procedure from image pickup by the image pickup apparatus to image display by the display apparatus.

The transmission form of image data from the image pickup apparatus 12 to the host terminal 20 and the transmission form of image data from the host terminal 20 to the display apparatus 16 described above can be carried out also in combination. FIG. 19 is a flow chart of a processing procedure from image pickup by the image pickup apparatus 12 to image display on the display apparatus 16 when the embodiment is carried out with both of the transmission routes. Processing of this flow chart is started when the user inputs a starting instruction for processing to the host terminal 20.

It is to be noted that, although the flow chart indicates transmission and reception of data principally for image display, particularly the host terminal 20 may perform various information processes of a game and so forth not depicted in parallel to each other. Further, in FIG. 19, a structure of data to be transmitted is indicated schematically together with the flow chart. Although they are based on left and right stereo images, there is no intention of restriction to them. First, the image pickup apparatus 12 starts image pickup and transmits data of the picked up image to the host terminal 20 (S10). The host terminal 20 produces an initial image using the data and transmits the initial image to the display apparatus 16 (S12).

The image data transmitted here may have a general structure as data for an initial image. The display apparatus 16 causes the data to be displayed on the display unit 422 (S14). Consequently, an initial state in which the picked up image is displayed as it is as a display image is established. Then, the gazing point detection unit 424 detects position coordinates of the gazing point of the user and transmits the information of the position coordinates to the host terminal 20 (S16). It is to be noted that, in a mode in which the host terminal 20 specifies a significant portion of a display image separately through detection of the face or the like, the process at step S16 may not be performed.

The host terminal 20 determines, on the basis of the information of the gazing point, a region to be requested for a 4/1 demosaic image and a region to be requested for a 1/1 demosaic image and issues a request for the determined regions and also for the ¼ demosaic image to the image pickup apparatus 12 (S18). However, the combination of images to be requested is not limited to this, but the ¼ demosaic image may be requested as part of the region or a ¹⁄₁₆ or lower demosaic image may be requested. The image pickup apparatus 12 extracts the requested regions from images beginning with images of the different resolutions of an image frame obtained when image pickup is started immediately after the request is received and connects the extracted regions for each row of the synthesis image and then transmits the resulting image (S20).

At this time, as regards the 4/1 demosaic image, the amount of data (number of pixels) to be outputted at a time in response to an outputting period of the 1/1 demosaic image is adjusted. This adjustment is repeated also for succeeding frames so that data of a uniform size continue to be transmitted to the host terminal 20 without being interrupted. The host terminal 20 separates the received image data for the individual image types and perform image processing as occasion demands (S22) and then produces a synthesis image again and transmits the synthesis image to the display apparatus 16 (S24). In this case, if the data of the 4/1 demosaic image are transmitted prior to the other data as described above, then the data of the 4/1 demosaic image can be prepared in time for display on the display apparatus 16 for each row.

The host terminal 20 processes also image data of succeeding frames transmitted from the image pickup apparatus 12 in a similar manner and continues to transmit a newly formed synthesis image. Consequently, data of a uniform size continue to be transmitted to the display apparatus 16 without interruption. When the display apparatus 16 receives the image data, it separates the image data into images of the individual types and expands the images suitably and then synthesizes the images such that the images are displayed at their original positions in the picked up image to produce a display image so as to be displayed (S26). The display apparatus 16 processes also image data of the succeeding frames transmitted from the host terminal 20 in a similar manner and continues to update the display. Consequently, a moving picture corresponding to the movement of the picked up moving picture can be displayed.

On the other hand, the gazing point detection unit 424 of the display apparatus 16 continues the gazing point detection process (S16). If the gazing point moves, then the host terminal 20 changes the region of the images to be requested to the image pickup apparatus 12 in response to a result of the movement (S18). Together with this, the regions of the images to be transmitted from the image pickup apparatus 12 to the host terminal 20 and hence the regions of the images to be transmitted from the host terminal 20 to the display apparatus 16 are changed (S20, S22, S24, and S26). Consequently, a moving picture in which a region of a high resolution moved in an interlocking relationship with the gazing point can be displayed.

Figure 20:
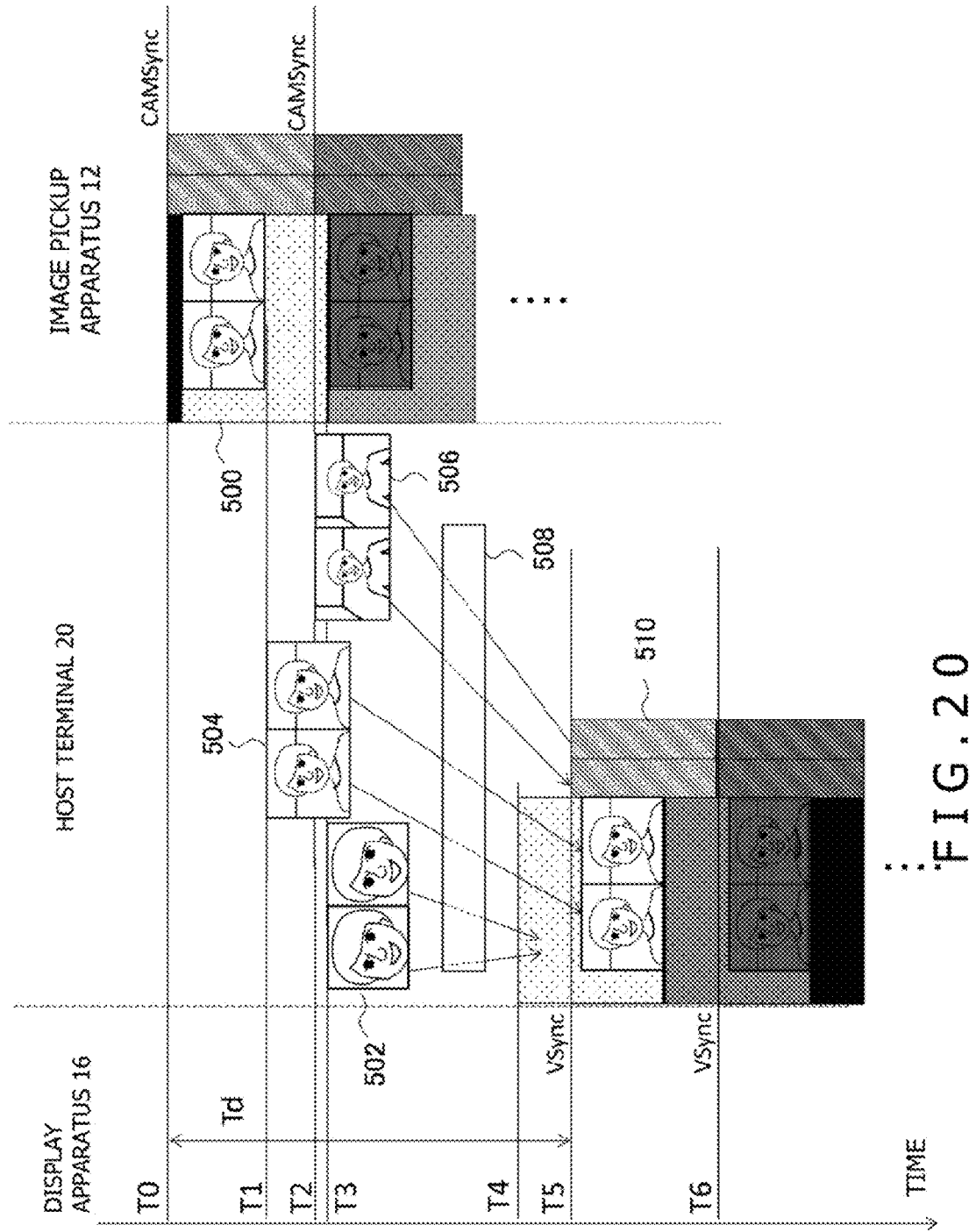
FIG. 20 is a diagrammatic view illustrating a relationship in timing between data transmission from the image pickup apparatus to the host terminal and data transmission from the host terminal to the display apparatus.

FIG. 20 is a view illustrating a relationship in timing between data transmission from the image pickup apparatus 12 to the host terminal 20 and data transmission from the host terminal 20 to the display apparatus 16 in the process depicted in FIG. 19. In FIG. 20, a time axis is represented in the vertical direction, and transition of a row of a synthesis image produced by and transmitted from the image pickup apparatus 12 and the host terminal 20 as time passes is represented in regions of the image pickup apparatus 12 and the host terminal 20. As described above, from the image pickup apparatus 12 to the host terminal 20, a synthesis image 500 of image data for one frame requested by the host terminal 20 is transmitted successively.

Since outputting of the synthesis image is performed in parallel with image pickup by the camera, output starting timings T0, T2, . . . of data of frames correspond to vertical synchronizing timings of the camera. It is to be noted that, in FIG. 20, in order to definitely indicate data of a frame to which attention is paid, the other data are represented by shadowing. If a ¼ demosaic image makes an entire region as in the case described above, then outputting of a ¼ demosaic image is started at time T0, and at a point of time at which pixel values for a requested region are produced after that, outputting of a 1/1 demosaic image and a 4/1 demosaic image is started.

Since the 1/1 demosaic image is smaller in region than the ¼ demosaic image and is outputted immediately, the data outputting is completed at the earliest timing (time T1). Then, the data outputting of the ¼ demosaic image is completed at time T2, and the data outputting of the 4/1 demosaic image is completed at time T3. The host terminal 20 separates the synthesis image transmitted thereto into a 4/1 demosaic image 502, a 1/1 demosaic image 504, and a ¼ demosaic image 506 and stores them into the main memory 42. Then, after suitable inputting to an image processing module 508 is performed, production and outputting of a synthesis image 510 based on the image data after processed are started.

It is to be noted that the image processing module 508 is implemented by cooperation of the information processing unit 38 and the image processing unit 40 depicted in FIG. 14 and performs predetermined processes such as image processing, face detection, rendering of a 3D object and so forth in accordance with the display method of the head-mounted display unit. Inputting to the image processing module 508 may be performed after the entire regions of the images are developed into the main memory 42 once or may be performed immediately for each row transmitted from the image pickup apparatus 12. Alternatively, as occasion demands, the image processing may not be performed or may be performed only for part of the images.

In any case, with regard to the synthesis image 510, after outputting of the 4/1 demosaic image is started first (time T4), outputting of the ¼ demosaic image is started (time T5). The outputting starting timing of the 1/1 demosaic image is determined naturally by adjusting the same to an outputting timing of the ¼ demosaic image of a corresponding row depending upon the position of the requested region in the heightwise direction. By making the time points T5, T6, . . . at which outputting of the ¼ demosaic image of each frame is to be started correspond to vertical synchronizing timings of the display apparatus, the 1/1 demosaic image and the ¼ demosaic image transmitted from the host terminal 20 can be displayed immediately for each row.

In the present mode, the time required from starting of image pickup to starting of display of the same frame is delayed by a time period Td from time T0 to time T5. However, since this time period can be utilized to permit image processing and allow the 4/1 demosaic image to be started earlier than the other data, all of the images of the resolutions of the same frame can be displayed together. The delay time is adjusted in accordance with a time period necessary for processing by the host terminal 20 so as to allow synchronization with scanning of the display apparatus 16.

On the other hand, also a mode in which a picked up image is displayed with a delay as reduced as possible may be applicable. FIG. 21 is a view illustrating a relationship in timing of data transmission in a mode in which the time period from image pickup to display is minimized. The manner of representation of FIG. 21 is similar to that of FIG. 20. Similarly as in the mode depicted in FIG. 20, production of a synthesis image of each frame and outputting of the synthesis image from the image pickup apparatus 12 to the host terminal 20 are started at a timing corresponding to a vertical synchronizing timing of the camera. On the other hand, in the present mode, data of a 1/1 demosaic image and a ¼ demosaic image for each row transmitted from the image pickup apparatus 12 are transmitted as they are from the host terminal 20 to the display apparatus 16.

In particular, after a ¼ demosaic image is transmitted at time T10, the host terminal 20 outputs the ¼ demosaic image as it is (time T11). At this time, the time period (T11 to T10) from acquisition to sending of the ¼ demosaic image is a very short period of time necessary for transmission of data and storage/readout of the data into and from a memory. Also succeeding rows are transmitted to the display apparatus 16 with a delay by the same very short period of time, and the 1/1 demosaic image and the ¼ demosaic image are successively displayed in parallel to image pickup. As a result, also transmission of the ¼ demosaic image of the same frame from the host terminal 20 to the display apparatus 16 is completed after a delay of the very short period of time from time T12 at which data of the last row of the ¼ demosaic image are transmitted from the image pickup apparatus 12 (time T13).

However, in the present mode, different from the case depicted in FIG. 20, it is difficult for the host terminal 20 to output the data of the 4/1 demosaic image prior to the data of the other images. This is because, at time T11 at which the data of the ¼ demosaic image are outputted, the image pickup apparatus 12 does not produce data in the pertaining region of the 4/1 demosaic image as yet. Therefore, in the present mode, the data of the 4/1 demosaic image are outputted after a delay by one frame. In other words, in a synthesis image 512, below regions 514a and 514b of the 1/1 demosaic image, a region 516 for the 4/1 demosaic image of the same frame is arranged.

It is to be noted that, except that the 4/1 demosaic image is delayed by one frame, the general configuration and the outputting timings are same as those of the synthesis image 510 of FIG. 20. Consequently, the 4/1 demosaic image of the preceding frame is displayed in accordance with immediate display of the 1/1 demosaic image and the ¼ demosaic image of the next frame. In short, in the present mode, it is considered that the immediacy of display of the ¼ demosaic image representing a wide range and the 1/1 demosaic image takes precedence. Such a display mode as just described is effective particularly in that, where the image pickup apparatus 12, host terminal 20, and display apparatus 16 are implemented integrally as a mirror-less single lens reflex camera, the delay of display in an electronic finder from a change of the field of view can be reduced.

In the foregoing description, a case is described in which a synthesis image is formed from a region of part of a 4/1 demosaic image, a region of part of a 1/1 demosaic image, and a region of an entire ¼ demosaic image. Meanwhile, the configuration of a synthesis image can be varied in various manners in the combination and the regions of the display contents and the contents of information processing in response to them. FIG. 22 depicts a plurality of examples of a configuration of a synthesis image. In FIG. 22, in each synthesis image, "4/1" is described in a region for a 4/1 demosaic image; "1/1" is described in a region for a 1/1 demosaic image; and "¼" is described in a region for a ¼ demosaic image so as to distinguish them from each other. Further, it is assumed that left and right stereo images are determined as an object of transmission.

The synthesis image in FIG. 22A is configured from a 1/1 demosaic image and a ¼ demosaic image. If it is assumed that data of 60 fps are transmitted using USB3.0 which has a transmission rate of 5 Gbps similarly as in the case described with reference to FIG. 13, data of 742×1280 pixels of the left and right 1/1 demosaic images can be included, and data of 320×1280 pixels of the left and right ¼ demosaic images can be included, in a synthesis image for one frame as depicted in FIG. 22A.

The synthesis image of FIG. 22B is configured from a 4/1 demosaic image and a ¼ demosaic image. In this case, data of 1485×1280 pixels of the left and right 4/1 demosaic images can be included, and data of 320×1280 pixels of the left and right ¼ demosaic image can be included, in a synthesis image for one frame. Where the data area for a 4/1 demosaic image is divided into regions for the left and right images, data of a region of 974×974 pixels can be included in each of the regions.

The synthesis image of FIG. 22C is configured only from left and right 4/1 demosaic images. Where the synthesis image is configured in this manner, data of 1250×1080 pixels can be included in a synthesis image for one frame. Since the transmission band or the processing performance is restricted, enhancement of the resolution and expansion of the angle of view originally have a tradeoff relationship therebetween. On the other hand, with the synthesis image depicted in FIG. 13 or the synthesis image depicted in FIG. 22A or 22B, the angle of view is expanded in a ¼ demosaic image and a significant portion is represented with a high resolution through a 4/1 demosaic image or a 1/1 demosaic image to achieve both of the enhancement of the resolution and the expansion of the angle of view.

Further, by transmitting only a necessary portion as a synthesis image, a region of a high resolution can be assured sufficiently without squeezing the transmission band. This applies also to the synthesis image of FIG. 22C of which only the 4/1 demosaic image is transmitted. It is to be noted that the configurations of the synthesis images depicted in FIGS. 13 and 22 may be switchably used as time passes. For example, when the speed at which the gazing point of the user moves is higher than a predetermined threshold value, it is considered that the location which the user wants to observe is not fixed. Therefore, a region of the 1/1 demosaic image having a wide range is transmitted in place of transmission of the 4/1 demosaic image as depicted in FIG. 22A.

Then, if the speed of the movement of the gazing point drops to a speed below the threshold value, then it is determined that the location to be observed comes to be fixed, and the 4/1 demosaic image in the region including the location like the synthesis image in FIG. 13 or FIG. 22B is transmitted. Further, in an image pickup environment in which the movement in a peripheral region is poor or low in significance, in order to update only the region being gazed by the user or an important region at a high rate, only the 4/1 demosaic image in the synthesis image of FIG. 22C is transmitted while the other region around the region may be formed from a still picture or may be updated at a low frame rate. If the configuration of a synthesis image is changed in response to an image pickup environment, display contents, the movement of the line of sight of the user or the like, then necessary data can be transmitted efficiently in accordance with the situation.

Figure 23:
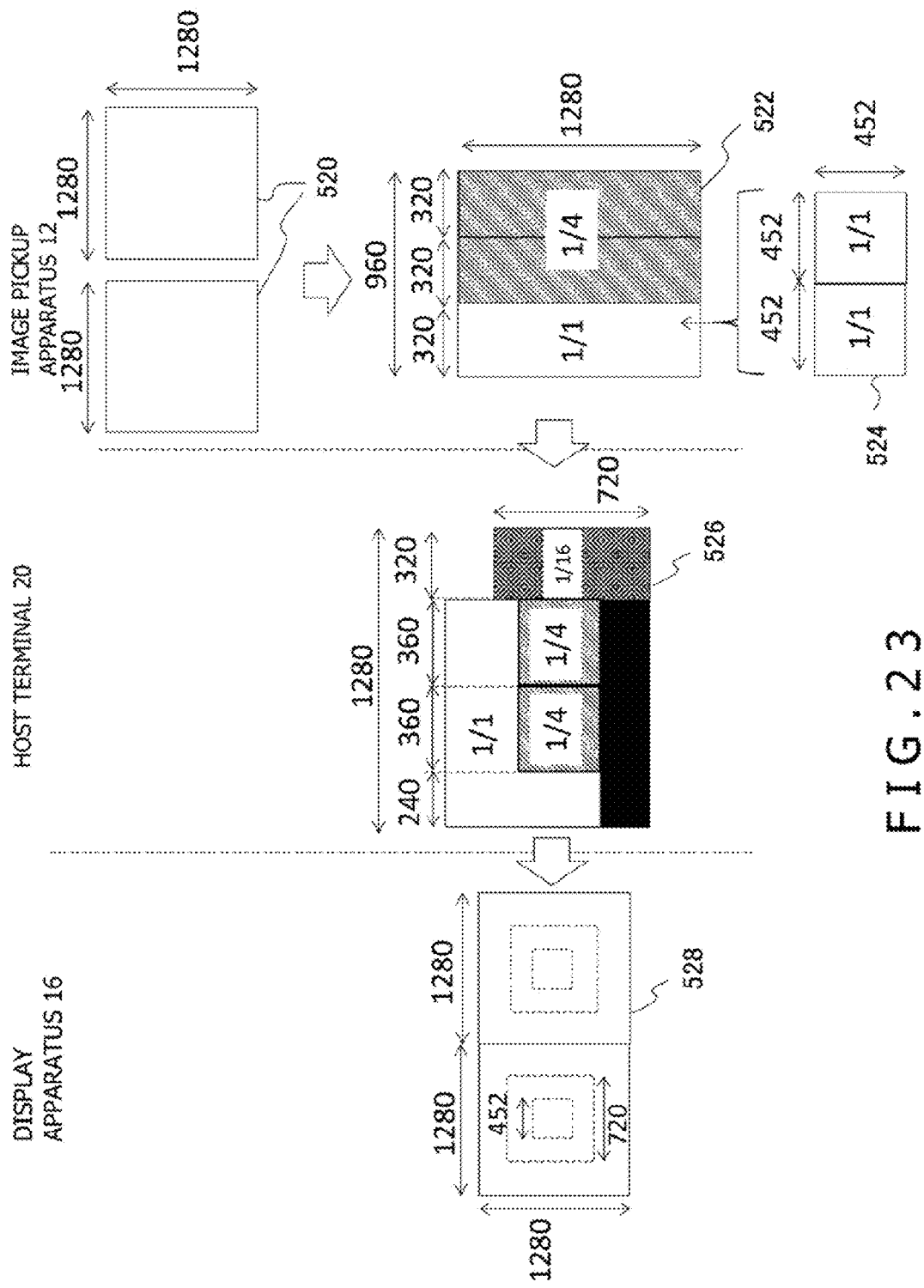
FIG. 23 is a diagrammatic view exemplifying a data configuration where image pickup and display are performed in 120 fps.

FIG. 23 exemplifies a data configuration where image pickup and display are performed at 120 fps. It is assumed that, at this time, transmission from the image pickup apparatus 12 to the host terminal 20 is performed using USB3.0 and transmission from the host terminal 20 to the display apparatus 16 is performed using HDMI. Further, it is assumed that the image pickup apparatus 12 has a stereo camera of 2560×2560 pixels. Thus, stereo images 520 of 1280×1280 pixels are picked up at 120 fps by binning. In this case, it may be required that the area of a synthesis image 522 upon transmission from the image pickup apparatus 12 to the host terminal 20 is made equal to or smaller than one half that at 60 fps.

Thus, the requirement is satisfied by the following measures. In particular, in images of 640×640 pixels obtained by reducing the original stereo images 520 to ¼ time in the vertical and horizontal directions, each one row is divided into left and right portions and is outputted over two rows. Further, regions 524 of 452×452 pixels from within the original stereo images 520 are outputted for each 320 pixels. It is to be noted here that the images after the binning are represented as "1/1," and images obtained by reducing the images to ¼ time are represented as "¼." It is to be noted that the 1/1 demosaic images have a role similar to that of the 4/1 demosaic image in the case of the foregoing description given with reference to FIG. 13 or the like.

In particular, data of each 1/1 demosaic image are stored into the frame memory 150 such that they are outputted gradually within time steps of 1280 irrespective of the timing at which data of the region 524 are produced. The host terminal 20 which receives such image data as just described reduces a ¼ demosaic image to ¼ time to produce a 1/16 demosaic image. Further, from the original ¼ demosaic image, only a necessary region is cut out to form an image of 360×360 pixels. Thereafter, if corresponding rows of the ¼ demosaic image and the 1/16 demosaic image are outputted at the same timing whereas the 1/1 demosaic image is stored precedently into the frame memory 406 of the display apparatus 16, then a synthesis image 526 comes to have a size of 1280×720 pixels.

By such a configuration as described above, the area of the synthesis image is equal to or smaller than one half that in the case of 60 fps depicted in FIG. 17. The display apparatus 16 which receives the image data expands the 1/16 demosaic images to 16 times and expands the ¼ demosaic images to four time and then synthesizes the resulting demosaic images and the 1/1 demosaic image to restore left and right images of 1280×1280 pixels. Consequently, a display image 528 in which the resolution differs in the different regions can be displayed. In this manner, even with the high frame rate of 120 fps, a transmission mode which exhibits a reduced delay can be established without changing a necessary transmission band.

With the present embodiment described above, when a plurality of kinds of image data to be used for display or information processing are transmitted in the form of a stream, an image which is to be connected for each row or for a unit obtained by dividing each row and an image which is to be connected irrespective of a row are provided in a stream. Even if a constraint condition is applied to outputting of image data of the former such as to synchronize the outputting with scanning upon image pickup or display, an image of the latter can be used for adjustment of the size of data to be outputted per unit time. Therefore, it is possible to achieve both of immediacy of data outputting and establishment of a steady state of the transmission data size. Further, only data of part of the regions can be transmitted selectively, and the transmission data size can be set to a size smaller than a value set in advance.

As a result, even if the frame rate or the resolution upon image pickup or display is increased, a maximum amount of data can be transmitted within a limited transmission bandwidth and besides transmission with low latency can be achieved. Even if the resolution is low, such an impression that the display image has immediacy as a whole can be provided by imposing a temporal constraint condition to an image which represents a wider range although the resolution is low. Further, in a region observed by a person or in a significant region, the transmission data size can be reduced without damaging the apparent definition by displaying a high resolution image in the region.

Further, since the type or the region of an image to be transmitted is changed freely in response to the movement of the line of sight, image pickup environment, display contents and so forth, optimum display according to variation of the situation can be implemented flexibly while a data size or a temporal constraint condition is satisfied.

The present technology has been described according to the embodiment thereof. The embodiment described hereinabove is illustrative, and it can be recognized by a person skilled in the art that various modifications can be made for combinations of the components and the processing procedures of the embodiment and that also the modifications are included in the spirit and scope of the present technology.

The present technology contains subject matter related to that disclosed in Japanese Priority Patent Application JP 2014-186670 filed in the Japan Patent Office on Sep. 12, 2014, the entire content of which is hereby incorporated by reference.

What is claimed is:

1. An image pickup apparatus, comprising:
a camera configured to produce data of a plurality of kinds of images from an image frame obtained by picking up an image of an object as a moving picture for each of pixel strings which configure a row; and
an image sending unit configured to extract a pixel string in a region requested from a host terminal from within the data of each of the plurality of kinds of images and connect the pixel strings to each other for each unit number of pixels for connection determined on a basis of a given rule to produce a stream and then transmit the stream to the host terminal;
wherein the image sending unit switchably determines whether the unit number of pixels for connection is to be set to a fixed value or a variable value in response to the kind of each image.

2. The image pickup apparatus according to claim 1,
wherein the image sending unit sets the unit number of pixels for connection for an image, to which a fixed number is to be applied, to a number of pixels for one row in the requested region or a number of pixels obtained by equally dividing one row into a given number but determines the unit number of pixels for connection of an image, to which a variable value is to be applied, such that a length of the stream when the connection of the plurality of kinds of images makes one round becomes equal to a given value.

3. The image pickup apparatus according to claim 1,
wherein, before the camera starts production of a pixel string of a row of an image to which a fixed number is to be applied, the image sending unit ends the connection of an extracted pixel string of a preceding row of the image to the stream.

4. The image pickup apparatus according to claim 1,
wherein, after the connection of the pixel strings for one frame of an image, to which a fixed number is to be applied, to the stream ends, the image sending unit connects, to a remaining pixel string of an image to which a variable number is to be applied, a pixel string of an image, to which a fixed number is to be applied, of a next image frame.

5. The image pickup apparatus according to claim 1,
wherein the camera produces a pair of data of the plurality of kinds of images from stereo images picked up by two cameras which pick up images of an object from left and right points of view spaced by a known distance from each other; and
the image sending unit connects, with regard to an image to which a fixed number is to be applied, next to a pixel string of the unit for connection of one of the pair of images, a pixel string of the unit for connection of an other one of the pair of images at a corresponding position, but starts, with regard to an image to which a variable number is to be applied, after the connection of all of pixel strings of one of the pair of images to the stream ends, connection of a pixel string of the other one of the pair of images.

6. An information processing apparatus comprising:
an image processing unit configured to produce data of a plurality of kinds of images to be displayed in one screen;
an image extraction unit configured to connect pixel strings, which configure a row of the data of the plurality of kinds of images, to each other for each unit number of pixels for connection determined on a basis of a given rule to produce a stream; and
a communication unit configured to transmit the stream to a display apparatus;
wherein the image extraction unit switchably determines whether the unit number of pixels for connection is to be set to a fixed value or a variable value in response to the kind of each image,
wherein the image extraction unit sets the unit number of pixels for connection for an image, to which a fixed number is to be applied, to a number of pixels for one row of the image or a number of pixels obtained by equally dividing one row into a given number but determines the unit number of pixels for connection of an image, to which a variable value is to be applied, such that a length of the stream when the connection of the plurality of kinds of images makes one round becomes equal to a given value.

7. The information processing apparatus according to claim 6,
wherein the image processing unit produces a pair of data of the plurality of kinds of images for regions obtained by dividing a screen of a head-mounted display unit, which is the display apparatus, into left and right portions; and
the image extraction unit connects, with regard to an image to which a fixed number is to be applied, next to a pixel string of the unit for connection of one of the pair of images, a pixel string of the unit for connection of an other one of the pair of images at a corresponding position, but starts, with regard to an image to which a variable number is to be applied, after the connection of all of pixel strings of one of the pair of images to the stream ends, connection of a pixel string of the other one of the pair of images.

8. A display apparatus comprising:
a communication unit configured to receive, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection;
a frame memory configured to store pixel strings of the second kind image included in the received stream irrespective of the unit for connection; and
a display image production unit configured to produce, every time a pixel string of the unit for connection of the first kind image included in the stream is received, pixel strings included in one row of a display screen from the pixel string and read out a pixel string included in a corresponding row of the second kind image from the frame memory and then output the produced pixel strings and the read out pixel string to positions at which the pixel strings are to be displayed in accordance with outputting scanning of the row of the display screen.

9. The display apparatus according to claim 8, wherein the stream includes, as the first kind image, data of an image of a first resolution which represents an entire display image and includes, as the second type image, data of an image of a second resolution which represents a region of part of the display image and is 4n times the first resolution, n being a natural number; and the display image production unit enlarges the image of the first resolution to 4n times and superposes the enlarged image on the image of the second resolution in a region represented by the image of the second resolution and then outputs the resulting image thereby to output one image which has different levels of detail in different regions thereof.

10. The display apparatus according to claim 9, further comprising
a gazing point detection unit configured to detect a gazing point of a user on a displayed image and notify the host terminal of the gazing point;
wherein the image of the second resolution is an image in a region determined by the host terminal so as to include the gazing point in the display image, and
the display image production unit outputs an image in which a region represented by a high level of detail moves in response to a movement of the gazing point.

11. An information processing system comprising:
an image pickup apparatus configured to pick up an image of an object as a moving picture;
a host terminal; and
a display apparatus configured to display a moving picture on a basis of an image frame obtained from the image picked up by the image pickup apparatus;
the image pickup apparatus including
a camera configured to produce data of a plurality of kinds of images from the image frame for each of pixel strings which configure a row, and
an image sending unit configured to extract a pixel string in a region requested from the host terminal from within the data of the plurality of kinds of images and produce a stream configured by connecting the pixel strings for each number of pixels determined on a basis of a predetermined rule and then transmit the stream to the host terminal;
the host terminal including
an image processing unit configured to classify a stream transmitted thereto from the image pickup apparatus for each kind of an image and perform a predetermined process to produce data of a plurality of kinds of images to be used for display,
an image extraction unit configured to produce a stream configured by connecting pixel strings, which configure a row of the data of the plurality of kinds of images, for each pixel number determined on a basis of a predetermined rule, and
a communication unit configured to transmit the stream to the display apparatus;

both of the image sending unit of the image pickup apparatus and the image extraction unit of the host terminal switchably determining whether the unit number of pixels for connection is to be set to a fixed pixel number equal to a number of pixels for one row in a region of an object of transmission or a number of pixels obtained by equally dividing one row into a given number or to a variable pixel number such that a length of the stream when the connection of the plurality of kinds of images makes one round becomes equal to a given value in response to the kind of each image;

the display apparatus including
a frame memory configured to store a pixel string of an image of the variable pixel number included in the received stream irrespective of the unit for connection, and
a display image production unit configured to produce, every time a pixel string of the fixed pixel number included in the stream is received, pixel strings included in one row of a display screen from the received pixel string and read out a pixel string included in a corresponding row from within the image of the variable pixel number from the frame memory and then output the produced pixel strings and the read out pixel string to a position at which the pixel strings are to be displayed in accordance with outputting scanning of the row of the display screen.

12. The information processing system according to claim 11,
wherein the display apparatus further includes a gazing point detection unit configured to detect a gazing point of a user on a displayed image thereon and notify the host terminal of information of position coordinates;
the communication unit of the host terminal requests the image pickup apparatus for transmission of a high-resolution image in a region determined so as to include the gazing point in the image frame and a low-resolution image representative of an entire region of the image frame;
both of the image sending unit of the image pickup apparatus and the image extraction unit of the host terminal produce the stream such that the high-resolution image has the variable pixel number while the low-resolution image has the fixed pixel number; and
the display image production unit of the display apparatus superposes the high-resolution image on an image obtained by enlarging the low-resolution image to output an image in which a region represented by a high level of detail moves in response to a movement of the gazing point.

13. The information processing system according to claim 12,
wherein the image sending unit of the image pickup apparatus changes over a kind of an image to be included in the stream in response to a speed of the movement of the gazing point.

14. An image data sending method performed by an image pickup apparatus, comprising:
producing data of a plurality of kinds of images from an image frame obtained by picking up an image of an object as a moving picture for each of pixel strings which configure a row and storing the produced data into a memory;
extracting a pixel string in a region requested from a host terminal from within the data of the plurality of kinds of images stored in the memory and producing a stream configured by connecting the pixel strings for each number of pixels determined on a basis of a given rule; and transmitting the produced stream to the host terminal;

the producing switchably determining whether the unit number of pixels for connection is to be set to a fixed value or a variable value in response to the kind of each image, wherein the extracting sets the unit number of pixels for connection for an image, to which a fixed number is to be applied, to a number of pixels for one row of the image or a number of pixels obtained by equally dividing one row into a given number but determines the unit number of pixels for connection of an image, to which a variable value is to be applied, such that a length of the stream when the connection of the plurality of kinds of images makes one round becomes equal to a given value.

15. An image data sending method performed by an information processing apparatus, comprising:

producing data of a plurality of kinds of images to be displayed in one screen and storing the produced data into a memory;

producing a stream which is configured by connecting pixel strings which are stored in the memory and configure a row of the data of the plurality of kinds of images for each unit number of pixels determined on a basis of a given rule; and transmitting the stream to a display apparatus;

wherein the producing switchably determines whether the unit number of pixels for connection is to be set to a fixed value or a variable value in response to the kind of each image, wherein, after the connection of the pixel strings for one frame of an image, to which a variable number is to be applied, to the stream ends, and a pixel string of an image, to which a variable number is to be applied, of a next image frame is connected to a remaining pixel string of an image to which a fixed number is to be applied.

16. An image displaying method performed by a display apparatus, comprising:

receiving, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection;

storing pixel strings of the second kind image included in the received stream irrespective of the unit for connection in a frame memory; and producing, every time a pixel string of the unit for connection of the first kind image included in the stream is received, pixel strings included in one row of a display screen from the pixel string, reading out a pixel string included in a corresponding row of the second kind image from the frame memory and then outputting the produced pixel strings and the read out pixel string to positions at which the pixel strings are to be displayed in accordance with outputting scanning of the row of the display screen.

17. A non-transitory computer readable medium having stored there on a computer program for a computer, the computer program causing the computer to execute the steps of:

producing data of a plurality of kinds of images from an image frame obtained by picking up an image of an object as a moving picture for each of pixel strings which configure a row;

extracting a pixel string in a region requested from a host terminal from within the data of each of the plurality of kinds of images and connecting the pixel strings to each other for each unit number of pixels for connection determined on a basis of a given rule to produce a stream; and transmitting the stream to the host terminal;

wherein the producing switchably determines whether the unit number of pixels for connection is to be set to a fixed value or a variable value in response to the kind of each image, wherein the extracting sets the unit number of pixels for connection for an image, to which a fixed number is to be applied, to a number of pixels for one row of the image or a number of pixels obtained by equally dividing one row into a given number but determines the unit number of pixels for connection of an image, to which a variable value is to be applied, such that a length of the stream when the connection of the plurality of kinds of images makes one round becomes equal to a given value.

18. A non-transitory computer readable medium having stored there on a computer program for a computer, the computer program causing the computer to execute the steps of:

producing data of a plurality of kinds of images to be displayed in one screen;

connecting pixel strings, which configure a row of the data of the plurality of kinds of images, to each other for each unit number of pixels for connection determined on a basis of a given rule to produce a stream; and transmitting the stream to a display apparatus;

wherein the producing switchably determines whether the unit number of pixels for connection is to be set to a fixed value or a variable value in response to the kind of each image, wherein the connecting sets the unit number of pixels for connection for an image, to which a fixed number is to be applied, to a number of pixels for one row of the image or a number of pixels obtained by equally dividing one row into a given number but determines the unit number of pixels for connection of an image, to which a variable value is to be applied, such that a length of the stream when the connection of the plurality of kinds of images makes one round becomes equal to a given value.

19. A non-transitory computer readable medium having stored there on a computer program for a computer, the computer program causing the computer to execute the steps of:

receiving, from a host terminal, a stream which is configured by connecting pixel strings which configure a row of data of a plurality of kinds of images to be displayed in one screen for each unit number of pixels determined on a basis of a predetermined rule and includes data of a first kind image wherein a pixel number for one row or a pixel number obtained by equally dividing one row into a predetermined number is used as a unit for connection and data of a second kind image wherein a number of pixels with which a length of the stream when the connection of the plurality of kinds of images makes one round becomes equal to a given value is used as a unit for connection;

storing pixel strings of the second kind image included in the received stream irrespective of the unit for connection in a frame memory; and producing, every time a pixel string of the unit for connection of the first kind image included in the stream is received, pixel strings included in one row of a display screen from the pixel string and reading out a pixel string included in a corresponding row of the second kind image from the frame memory and then outputting the produced pixel strings and the read out pixel string to positions at which the pixel strings are to be displayed in accordance with outputting scanning of the row of the display screen.

* * * * *